United States Patent
Thompson et al.

(10) Patent No.: US 9,857,518 B2
(45) Date of Patent: Jan. 2, 2018

(54) DIRECT-LIT BACKLIGHT HAVING LIGHT RECYCLING CAVITY WITH CONCAVE TRANSFLECTOR

(75) Inventors: David Scott Thompson, Woodbury, MN (US); Craig R. Schardt, St. Paul, MN (US); Brian W. Ostlie, Hudson, WI (US); Scott J. Kienitz, Woodbury, MN (US); John A. Wheatley, Lake Elmo, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 741 days.

(21) Appl. No.: 12/905,937

(22) Filed: Oct. 15, 2010

(65) Prior Publication Data

US 2011/0025947 A1 Feb. 3, 2011

Related U.S. Application Data

(63) Continuation of application No. 11/212,166, filed on Aug. 27, 2005, now Pat. No. 7,815,355.

(51) Int. Cl.
*F21V 8/00* (2006.01)
*G02F 1/1335* (2006.01)

(52) U.S. Cl.
CPC ..... *G02B 6/0028* (2013.01); *G02F 1/133606* (2013.01); *G02F 1/133603* (2013.01); *G02F 2001/133613* (2013.01)

(58) Field of Classification Search
USPC ....... 362/560, 561, 555, 624, 627, 511, 330, 362/97.1, 97.2, 97.3; 313/512; 349/62
See application file for complete search history.

(56) References Cited

U.S. PATENT DOCUMENTS

| 3,532,871 A | 10/1970 | Shipman |
| 4,241,980 A | 12/1980 | Mihalakis et al. |

(Continued)

FOREIGN PATENT DOCUMENTS

| CN | 2613785 | 4/2004 |
| CN | 1512232 | 7/2004 |

(Continued)

OTHER PUBLICATIONS

U.S. Application entitled "Method of Forming Direct-lit Backlights having Light Recycling Cavity with Concave Transflector", filed Aug. 27, 2005, having U.S. Appl. No. 60/711,523.

(Continued)

*Primary Examiner* — Sharon Payne
(74) *Attorney, Agent, or Firm* — Daniel J. Iden

(57) ABSTRACT

Direct-lit backlights and associated methods and components are disclosed in which a transflector that partially transmits and partially reflects incident light is shaped to form at least one concave structure facing a back reflector of the backlight. This provides at least one recycling cavity therebetween, the at least one recycling cavity substantially filling the output area of the backlight. At least one light source is disposed behind the output area to inject light into each cavity, and can be positioned in the recycling cavity or behind an aperture in the back reflector. The cavities are preferably shallow and wide, having a width-to-depth ratio of at least 5 or 10, and can provide uniform brightness and color at the output area with sparsely distributed light sources and in a thin profile backlight.

17 Claims, 7 Drawing Sheets

(56) References Cited

U.S. PATENT DOCUMENTS

| | | |
|---|---|---|
| 4,349,598 A | 9/1982 | White |
| 4,561,044 A | 12/1985 | Ogura et al. |
| 4,588,258 A | 5/1986 | Hoopman |
| 4,775,219 A | 10/1988 | Appeldorn et al. |
| 4,850,665 A | 7/1989 | Whitehead |
| 4,906,070 A | 3/1990 | Cobb, Jr. |
| 4,938,563 A | 7/1990 | Nelson et al. |
| 4,952,023 A | 8/1990 | Bradshaw et al. |
| 5,122,902 A | 6/1992 | Benson |
| 5,136,479 A | 8/1992 | Ruffner |
| 5,138,488 A | 8/1992 | Szczech |
| 5,186,530 A | 2/1993 | Whitehead |
| 5,190,370 A | 3/1993 | Miller |
| 5,195,818 A | 3/1993 | Simmons et al. |
| 5,309,544 A | 5/1994 | Saxe |
| 5,337,068 A | 8/1994 | Stewart et al. |
| 5,339,382 A | 8/1994 | Whitehead |
| 5,375,043 A | 12/1994 | Tokunaga |
| 5,396,350 A | 3/1995 | Beeson et al. |
| 5,450,285 A | 9/1995 | Schlemmer |
| 5,485,038 A | 1/1996 | Licari et al. |
| 5,598,281 A | 1/1997 | Zimmerman et al. |
| 5,638,084 A | 6/1997 | Kalt |
| 5,676,453 A | 10/1997 | Parkyn, Jr. et al. |
| 5,751,388 A | 5/1998 | Larson |
| 5,793,456 A | 8/1998 | Broer et al. |
| 5,825,543 A | 10/1998 | Ouderkirk et al. |
| 5,828,488 A | 10/1998 | Ouderkirk et al. |
| 5,840,405 A | 11/1998 | Shusta et al. |
| 5,845,038 A | 12/1998 | Lundin et al. |
| 5,867,316 A | 2/1999 | Carlson et al. |
| 5,882,774 A | 3/1999 | Jonza et al. |
| 5,889,615 A | 3/1999 | Dreyer et al. |
| 5,899,552 A | 5/1999 | Yokoyama et al. |
| 5,948,488 A | 9/1999 | Marecki et al. |
| 5,959,316 A | 9/1999 | Lowery |
| 6,007,209 A | 12/1999 | Pelka |
| 6,079,844 A | 6/2000 | Whitehead et al. |
| 6,096,247 A | 8/2000 | Ulsh et al. |
| 6,101,032 A | 8/2000 | Wortman et al. |
| 6,111,696 A | 8/2000 | Allen et al. |
| 6,122,103 A | 9/2000 | Perkins et al. |
| 6,164,782 A | 12/2000 | Pojar |
| 6,241,363 B1 | 6/2001 | Lee |
| 6,277,471 B1 | 8/2001 | Tang |
| 6,280,822 B1 | 8/2001 | Smith et al. |
| 6,287,670 B1 | 9/2001 | Benson et al. |
| 6,317,263 B1 | 11/2001 | Moshrefzadeh et al. |
| 6,330,111 B1 | 12/2001 | Myers |
| 6,331,915 B1 | 12/2001 | Myers |
| 6,354,709 B1 | 3/2002 | Campbell et al. |
| 6,367,941 B2 | 4/2002 | Lea et al. |
| 6,416,201 B1 | 7/2002 | Strand et al. |
| 6,473,554 B1 | 10/2002 | Pelka et al. |
| 6,494,585 B1 | 12/2002 | Wada |
| 6,504,649 B1 | 1/2003 | Myers |
| 6,505,959 B2 | 1/2003 | Masaki et al. |
| 6,568,822 B2 | 5/2003 | Boyd et al. |
| 6,582,103 B1 | 6/2003 | Popovich et al. |
| 6,598,998 B2 | 7/2003 | West et al. |
| 6,604,839 B2 | 8/2003 | Coleman et al. |
| 6,612,723 B2 | 9/2003 | Futhey et al. |
| 6,655,810 B2 | 12/2003 | Hayashi et al. |
| 6,674,096 B2 | 1/2004 | Sommers |
| 6,700,716 B2 | 3/2004 | Sejkora |
| 6,709,122 B2 | 3/2004 | Adachi et al. |
| 6,752,505 B2 | 6/2004 | Parker et al. |
| 6,759,113 B1 | 7/2004 | Tang |
| 6,762,743 B2 | 7/2004 | Yoshihara et al. |
| 6,764,096 B2 | 7/2004 | Quioc |
| 6,767,609 B2 | 7/2004 | Aeling et al. |
| 6,771,335 B2 | 8/2004 | Kimura et al. |
| 6,805,468 B2 | 10/2004 | Itoh et al. |
| 6,827,456 B2 | 12/2004 | Parker et al. |
| 6,843,582 B2 | 1/2005 | Chang |
| 6,845,212 B2 | 1/2005 | Gardiner et al. |
| 6,846,089 B2 | 1/2005 | Stevenson et al. |
| 6,874,902 B2 | 4/2005 | Yamashita et al. |
| 6,964,497 B2 | 11/2005 | Greiner |
| 6,974,229 B2 | 12/2005 | West et al. |
| 7,263,268 B2 | 8/2007 | Inditsky |
| 7,278,771 B2 | 10/2007 | Campbell |
| 7,350,951 B2 | 4/2008 | Sakai |
| 7,436,469 B2 | 10/2008 | Gehlsen |
| 7,815,355 B2 | 10/2010 | Thompson et al. |
| 2001/0021110 A1 | 9/2001 | Nakayama et al. |
| 2002/0080598 A1 | 6/2002 | Parker et al. |
| 2002/0097354 A1 | 7/2002 | Greiner |
| 2002/0159019 A1 | 10/2002 | Pokorny et al. |
| 2002/0163791 A1 | 11/2002 | Hoelen et al. |
| 2002/0190406 A1 | 12/2002 | Merrill et al. |
| 2003/0035231 A1 | 2/2003 | Epstein et al. |
| 2003/0039030 A1 | 2/2003 | Myers |
| 2003/0058553 A1 | 3/2003 | Epstein et al. |
| 2003/0076034 A1 | 4/2003 | Marshall et al. |
| 2003/0107892 A1 | 6/2003 | Yao |
| 2003/0214728 A1 | 11/2003 | Olczak |
| 2004/0001330 A1 | 1/2004 | Kang et al. |
| 2004/0012943 A1 | 1/2004 | Toyooka |
| 2004/0041965 A1 | 3/2004 | Liu |
| 2004/0070100 A1 | 4/2004 | Strobel et al. |
| 2004/0080938 A1 | 4/2004 | Holman et al. |
| 2004/0093779 A1 | 5/2004 | Blach |
| 2004/0114343 A1 | 6/2004 | Ho |
| 2004/0174717 A1 | 9/2004 | Adachi et al. |
| 2004/0183787 A1 | 9/2004 | Geaghan et al. |
| 2004/0218388 A1 | 11/2004 | Suzuki |
| 2004/0218390 A1 | 11/2004 | Holman et al. |
| 2004/0228106 A1 | 11/2004 | Stevenson et al. |
| 2004/0228107 A1 | 11/2004 | Lee et al. |
| 2004/0233665 A1 | 11/2004 | West et al. |
| 2004/0262623 A1 | 12/2004 | You |
| 2005/0001537 A1 | 1/2005 | West et al. |
| 2005/0002205 A1 | 1/2005 | Yu et al. |
| 2005/0024754 A1 | 2/2005 | Epstein et al. |
| 2005/0063063 A1 | 3/2005 | Ashdown |
| 2005/0073070 A1 | 4/2005 | Getschel et al. |
| 2005/0094401 A1 | 5/2005 | Magarill |
| 2005/0111241 A1 | 5/2005 | Parker |
| 2005/0122591 A1 | 6/2005 | Parker et al. |
| 2005/0156495 A1 | 7/2005 | Tomoda et al. |
| 2005/0243576 A1 | 11/2005 | Park et al. |
| 2005/0265029 A1 | 12/2005 | Epstein et al. |
| 2005/0280752 A1 | 12/2005 | Kim et al. |
| 2006/0007703 A1 | 1/2006 | Wang |
| 2006/0055627 A1 | 3/2006 | Wilson |
| 2006/0072313 A1 | 4/2006 | Magarill |
| 2006/0072340 A1 | 4/2006 | Liao et al. |
| 2006/0082698 A1 | 4/2006 | Ko et al. |
| 2006/0082700 A1 | 4/2006 | Gehlsen et al. |
| 2006/0092490 A1 | 5/2006 | McCollum et al. |
| 2006/0131596 A1 | 6/2006 | Ouderkirk et al. |
| 2006/0131601 A1 | 6/2006 | Ouderkirk et al. |
| 2006/0131602 A1 | 6/2006 | Ouderkirk et al. |
| 2006/0158080 A1 | 7/2006 | Nakano et al. |
| 2006/0187650 A1 | 8/2006 | Epstein |
| 2006/0262554 A1 | 11/2006 | Mok et al. |
| 2006/0290844 A1 | 12/2006 | Epstein et al. |
| 2007/0047219 A1 | 3/2007 | Thompson et al. |
| 2007/0047228 A1 | 3/2007 | Thompson et al. |
| 2007/0047254 A1 | 3/2007 | Schardt et al. |
| 2007/0047262 A1 | 3/2007 | Schardt et al. |

FOREIGN PATENT DOCUMENTS

| | | |
|---|---|---|
| EP | 1 486 818 | 12/2004 |
| EP | 1 496 489 | 1/2005 |
| EP | 1 550 886 | 7/2005 |
| GB | 2 267 378 | 10/1993 |
| JP | 2003-36713 | 3/1991 |
| JP | 07-005326 | 1/1995 |

(56) References Cited

FOREIGN PATENT DOCUMENTS

| | | |
|---|---|---|
| JP | 2002-182202 | 6/2002 |
| JP | 2002-244572 | 8/2002 |
| JP | 2003-123526 | 4/2003 |
| JP | 2004/055327 | 2/2004 |
| JP | 2004-109644 | 4/2004 |
| JP | 2004/221390 | 8/2004 |
| JP | 2004-233828 | 8/2004 |
| JP | 2004/325958 | 11/2004 |
| JP | 2004-333520 | 11/2004 |
| JP | 2005-071733 | 3/2005 |
| JP | 2005-100837 | 4/2005 |
| JP | 2005/100837 | 4/2005 |
| JP | 2006-32103 | 2/2006 |
| KR | 10-2004-0010261 | 1/2004 |
| KR | 10-2004-0061959 | 7/2004 |
| KR | 10-2004-0083891 | 10/2004 |
| KR | 10-2006-0000765 | 1/2006 |
| WO | WO 99/42861 | 8/1999 |
| WO | WO 02/04858 | 1/2002 |
| WO | WO 2005/003851 | 1/2005 |
| WO | WO 2005/031483 | 4/2005 |
| WO | WO 2005/073622 | 8/2005 |
| WO | WO 2005/120791 | 12/2005 |

OTHER PUBLICATIONS

U.S. Application entitled "Direct-lit Backlight having Light Sources with Bifunctional Diverters", filed Aug. 27, 2005, having U.S. Appl. No. 60/711,522.

U.S. Application entitled "Edge-lit Backlight having Light Recycling Cavity with Concave Transflector," filed Aug. 27, 2005, having U.S. Appl. No. 60/711,250.

U.S. Application entitled "Illumination Assembly and System Using Same", filed Aug. 27, 2005, having U.S. Appl. No. 60/711,519.

U.S. Application entitled "Color Mixing Illumination Assembly and System using Same", filed Aug. 27, 2005, having U.S. Appl. No. 60/711,551.

U.S. Application entitled "Illumination Assembly and System using Same", filed Sep. 2, 2005, having U.S. Appl. No. 60/714,068.

U.S. Application entitled "Color Mixing Illumination Assembly and System using Same", filed Sep. 2, 2005, having U.S. Appl. No. 60/714,072.

U.S. Application entitled "Illumination Assembly and System," filed Oct. 21, 2005, having U.S. Appl. No. 60/729,370.

Brochure "3M™ Image Directing Film (IDF) II," © 3M, 1996.

Brochure "3M™ Diffusing Film Alternative (DFA)," © 3M, St. Paul, MN (1996).

Brochure "3M™ Transmissive Right Angle Film (TRAF) II," © 3M, St. Paul, MN (1996).

Brochure "3M™ Brightness Enhancement Film (BEF) I," © 3M, St. Paul, MN (1996).

DIRECT-LIT BACKLIGHT HAVING LIGHT RECYCLING CAVITY WITH CONCAVE TRANSFLECTOR

CROSS REFERENCE TO RELATED APPLICATIONS

This application is a continuation of U.S. application Ser. No. 11/212,166, filed on Aug. 27, 2005, now U.S. Pat. No. 7,815,355 now allowed, and incorporated herein by reference.

FIELD OF THE INVENTION

The present invention relates to backlights, particularly direct-lit backlights, as well as to components used in backlights, systems that use backlights, and methods of making and using backlights. The invention is particularly well suited to backlights used in liquid crystal display (LCD) devices and similar displays, as well as to backlights that utilize LEDs as a source of illumination.

BACKGROUND

Recent years have seen tremendous growth in the number and variety of display devices available to the public. Computers (whether desktop, laptop, or notebook), personal digital assistants (PDAs), mobile phones, and thin LCD TVs are but a few examples. Although some of these devices can use ordinary ambient light to view the display, most include a light panel referred to as a backlight to make the display visible.

Many such backlights fall into the categories of "edge-lit" or "direct-lit". These categories differ in the placement of the light sources relative to the output area of the backlight, where the output area defines the viewable area of the display device. In edge-lit backlights, a light source is disposed along an outer border of the backlight construction, outside the zone corresponding to the output area. The light source typically emits light into a light guide, which has length and width dimensions on the order of the output area and from which light is extracted to illuminate the output area. In direct-lit backlights, an array of light sources is disposed directly behind the output area, and a diffuser is placed in front of the light sources to provide a more uniform light output. Some direct-lit backlights also incorporate an edge-mounted light, and are thus capable of both direct-lit and edge-lit operation.

It is known for direct-lit backlights to use an array of cold cathode fluorescent lamps (CCFLs) as the light sources. It is also known to place a diffuse white reflector as a back reflector behind the CCFL array, to increase brightness and presumably also to enhance uniformity across the output face.

Recently, liquid crystal display television sets (LCD TVs) have been introduced that use a direct-lit backlight powered not by CCFLs but by an array of red/green/blue LEDs. An example is the Sony™ Qualia 005 LED Flat-Screen TV. The 40 inch model uses a direct-lit backlight containing five horizontal rows of side-emitting Luxeon™ LEDs, each row containing 65 such LEDs arranged in a GRBRG repeating pattern, and the rows being spaced 3.25 inches apart. This backlight is about 42 mm deep, measured from the front of a diffuse white back reflector to the back of a (about 2 mm thick) front diffuser, between which is positioned a flat transparent plate having an array of 325 diffuse white reflective spots. Each of these spots, which transmit some light, is aligned with one of the LEDs to prevent most of the on-axis light emitted by the LED from striking the front diffuser directly. The back reflector is flat, with angled sidewalls.

BRIEF SUMMARY

The present application discloses, inter alia, direct-lit backlights that include a back reflector and a transflector that partially transmits and partially reflects incident light. The transflector is shaped to form at least one concave structure facing the back reflector to provide one or more recycling cavities therebetween. In some cases the backlight may have only one recycling cavity, while in others it can have a plurality of such cavities. In either case, the single cavity or group of cavities are sized and arranged to substantially fill the output area of the panel. Further, at least one light source, and in some cases an array of light sources, is disposed behind the output area of the backlight to inject light into each recycling cavity. In some cases one or more light sources are disposed in a given recycling cavity; in some cases it or they can be disposed behind the back reflector to inject light into the recycling cavity, for example through one or more apertures in the back reflector. Advantageously, conventional packaged or unpackaged LEDs can be used as light sources.

The concave nature of the transflector has been found to be particularly effective in providing uniform illumination over the area of the recycling cavity, even when using sparsely arranged discrete light sources such as LEDs. It has also been found to be effective in color mixing light from different colored discrete light sources, such as an array of individual red/green/blue LEDs.

To minimize the overall thickness of the backlight and the number of required light sources, the transflector's concave shape and its placement relative to the back reflector can provide a relatively shallow and wide recycling cavity. In this regard, the recycling cavity preferably has a width that is more than two times, and preferably at least five times or ten times, the recycling cavity's depth. The recycling cavity can be substantially one-dimensional, forming an extended tunnel-like structure, or two-dimensional, forming a closed cell where the transflector is concave in each of two orthogonal cross-sectional planes. The recycling cavity is also preferably hollow to minimize panel weight.

For enhanced panel efficiency the back reflector is preferably highly reflective, e.g., at least 90% average reflectivity for visible light emitted by the light sources, and in exemplary embodiments at least 95, 98, or 99% or more. The back reflector can be a predominantly specular, diffuse, or combination specular/diffuse reflector.

The transflector can comprise a variety of partially transmissive and partially reflective films or bodies, and for enhanced panel efficiency the transflector desirably has low absorptive losses. Structured surface films such as films having parallel grooves forming extended linear prisms, or films having patterns of pyramidal prisms such as cube corner element arrays, are one example. Reflective polarizers, whether specularly reflective or diffusely reflective, are another example. The reflective polarizer may have a coextruded polymeric multilayer construction, a cholesteric construction, a wire grid construction, or a blended (continuous/disperse phase) film construction, and thus can transmit and reflect light specularly or diffusely. A perforated specular or diffuse reflective film is another example of a suitable transflector.

Associated components, systems, and methods are also disclosed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein:

FIG. 2 is a schematic side elevational view of the backlight of FIGS. 1 and 1a;

DETAILED DESCRIPTION OF THE ILLUSTRATIVE EMBODIMENTS

Figure 1:
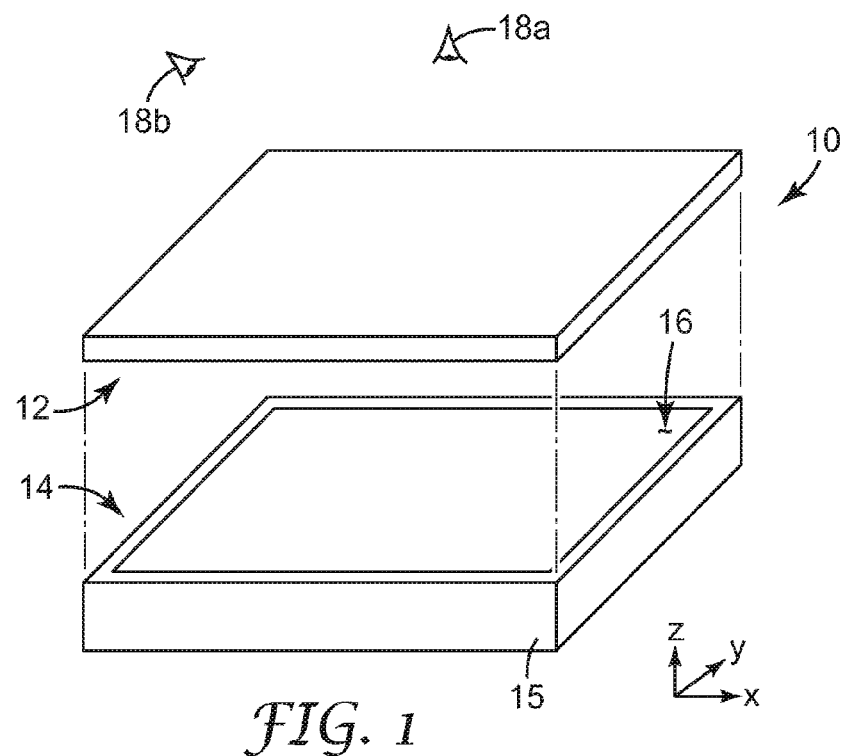
FIG. 1 is a perspective exploded view of a display system that includes a backlight.

One popular application of a backlight is shown schematically in the perspective exploded view of FIG. 1. There, a display system 10 includes a display panel 12, such as a liquid crystal display (LCD) panel, and a direct-lit backlight 14 that provides large area illumination sufficient for information contained in the display panel to be easily observed. Both display panel 12 and backlight 14 are shown in simplified box-like form, but the reader will understand that each contains additional detail. Backlight 14 emits light over an extended output area 16, and may also include a frame 15. The output area 16, which is usually rectangular but can take on other extended area shapes as desired, may correspond to the outer surface of a film used in the backlight, or may simply correspond to an aperture in the frame 15. In operation, the entire output area 16 is illuminated by light source(s) disposed within frame 15 but positioned directly behind the output area 16. When illuminated, the backlight 14 makes visible for a variety of observers 18a, 18b an image or graphic provided by display panel 12. In the case of an LCD panel, the image or graphic is dynamic, produced by an array of typically thousands or millions of individual picture elements (pixels), which array substantially fills the lateral dimensions, i.e. the length and width, of the display panel 12. In other embodiments the display panel may be or comprise a film having a static graphic image printed thereon. FIG. 1 also includes a Cartesian x-y-z coordinate system for reference purposes.

In some LCD embodiments, the backlight 14 continuously emits white light and the pixel array is combined with a color filter matrix to form groups of multicolored pixels (such as yellow/blue (YB) pixels, red/green/blue (RGB) pixels, red/green/blue/white (RGBW) pixels, red/yellow/green/blue (RYGB) pixels, red/yellow/green/cyan/blue (RYGCB) pixels, or the like) so that the displayed image is polychromatic. Alternatively, polychromatic images can be displayed using color sequential techniques, where, instead of continuously back-illuminating the display panel with white light and modulating groups of multicolored pixels in the display panel to produce color, separate differently colored light sources within the backlight itself (selected, for example, from red, orange, amber, yellow, green, cyan, blue (including royal blue), and white in combinations such as those mentioned above) are modulated such that the backlight flashes a spatially uniform colored light output (such as, for example, red, then green, then blue) in rapid repeating succession. This color-modulated backlight is then combined with a display module that has only one pixel array (without any color filter matrix), the pixel array being modulated synchronously with the backlight to produce the whole gamut of achievable colors (given the light sources used in the backlight) over the entire pixel array, provided the modulation is fast enough to yield temporal color-mixing in the visual system of the observer. Examples of color sequential displays, also known as field sequential displays, are described in U.S. Pat. No. 5,337,068 (Stewart et al.) and U.S. Pat. No. 6,762,743 (Yoshihara et al.), hereby incorporated by reference. In some cases, it may be desirable to provide only a monochrome display. In those cases the backlight 14 can include filters or specific sources that emit predominantly in one visible wavelength or color.

Figure 1A:
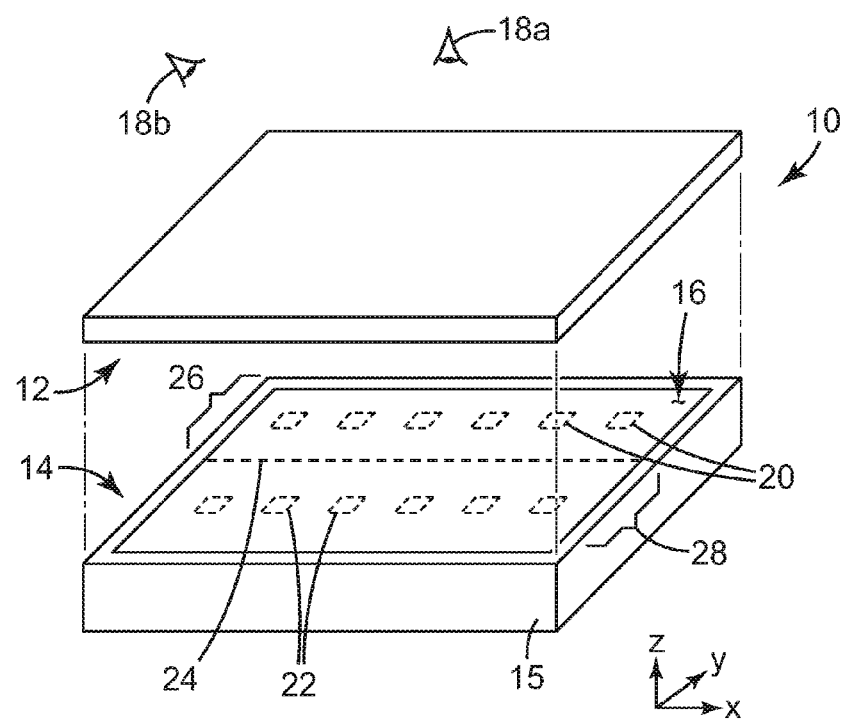
FIG. 1a is a view similar to FIG. 1 but also showing in phantom the location of discrete light sources and light recycling cavities disposed behind the output area of the backlight.

The display system 10 is shown again in FIG. 1a, with FIG. 1a additionally showing in phantom a first row of discrete light sources 20 and a second row of discrete light sources 22 within the direct-lit backlight 14. The light sources 20, 22 may each emit white light, or may each emit only one of the RYGCB colors and then either be mixed to provide a white light output or be matched to provide a monochrome output. Also shown in phantom is a boundary 24, which separates a first recycling cavity 26, illuminated by sources 20, from a second recycling cavity 28, illuminated by sources 22. Both recycling cavities, as well as the sources 20 and 22, are disposed directly behind the output area 16.

Collectively, the recycling cavities 26, 28 substantially fill the output area 16. Thus, if the output area is depicted in plan view, as for example when viewed by a distant observer situated along an axis perpendicular to the output area, the summed projected area of the concave recycling cavities (even though such cavities may not be visually apparent to the distant observer) is more than half the surface area of the output area, preferably at least 75%, 80%, or 90% of the output area, more preferably about 100% of the output area. Whether the backlight has only one concave recycling cavity or a plurality of them, the projected area of the cavity or cavities when viewing the output area in plan view accounts for preferably at least 75%, 80%, or 90%, or 100%, of the backlight output area.

Figure 2:
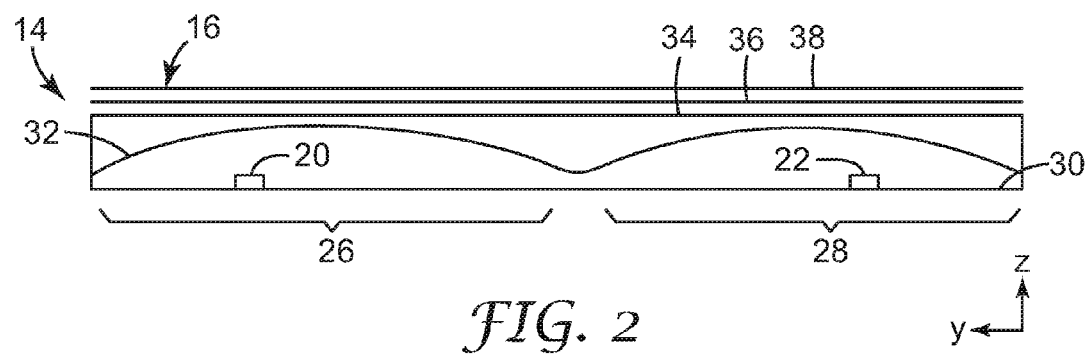

A schematic side elevational view of selected components of backlight 14 is shown in FIG. 2. The two recycling cavities 26, 28 are formed by a back reflector 30 and a transflector 32, the transflector being shaped to form two concave structures as shown, each of which face the back reflector to form the neighboring recycling cavities 26, 28. Discrete light sources 20 are disposed in recycling cavity 26 between the back reflector and the transflector. The placement of the sources 20, 22 directly behind the output area 16 is consistent with the backlight 14 being of the direct-lit variety. In front of the transflector 32 (from the perspective of the observer) are some additional light management films or other components, some or all of which may be optional depending on system requirements and characteristics of the light recycling cavities and light sources. Thus, in front of the transflector is a diffuser plate or film 34, and a top film stack comprising conventional light management films such as a reflective polarizer 36 and a prismatic brightness enhancement film 38.

Figure 2A:
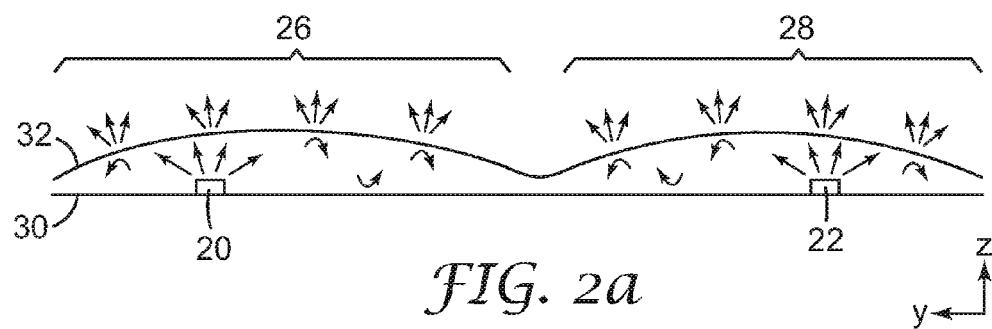
FIG. 2a is a view similar to FIG. 2 but showing only selected components of the backlight, and showing how light rays emitted by the light sources are recycled within the cavities and emitted through the transflector.

FIG. 2a is a detail of FIG. 2, showing how light emitted by the light sources is partially transmitted and partially reflected by the transflector 32, and how this in combination with the back reflector 30 provides light recycling within the cavities 26, 28, as well as light emission or leakage spread over the lateral dimensions of the cavities. The concave structures of the transflector not only help define the boundaries of the recycling cavities, they also have a tendency to confine recycled light within those boundaries, and to spread out the angular wedge of emitted light due to the changing geometry of the transflecting surface. Light confinement within a particular recycling cavity is a function of design details. For example, light confinement within cavities 26, 28 can be increased (and light leakage between the cavities correspondingly decreased) by positioning the transflector 32 closer to the back reflector 30, until in the limit the transflector contacts the back reflector along a line corresponding to the boundary 24 shown in FIG. 1a. Such positioning is desirable from the standpoint of reducing the overall backlight thickness.

Figure 2B:
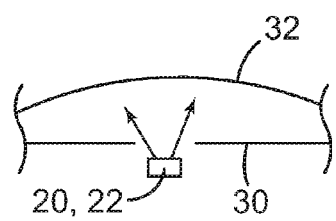
FIG. 2b is a fragmentary view showing a light source positioned behind the back reflector of a recycling cavity.

Instead of being located inside the cavities, the sources can alternatively be positioned behind the back reflector 30 by translating them along the negative z direction, as long as back reflector 30 is provided with suitable apertures, such as corresponding holes, slots, windows, or other light-transmitting areas, so that light from the sources can still be directly injected into the cavities. This is shown in the fragmentary view of FIG. 2b.

As discussed in further detail below, a given light source can be (1) an active component such as an LED die or fluorescent lamp that converts electricity to light or a phosphor that converts excitation light to emitted light, or (2) a passive component such as a lens, waveguide (such as a fiber), or other optical element that transports and/or shapes the light emitted by an active component, or (3) a combination of one or more active and passive components. For example, light sources 20, 22 in FIGS. 2 and 2a may be packaged side-emitting LEDs in which an LED die is disposed behind the back reflector 30 proximate a circuit board or heat sink, but a shaped encapsulant or lens portion of the packaged LED is disposed in the recycling cavity by extending through a slot or aperture in the back reflector. More discussion of light sources is provided below.

In the embodiment of FIGS. 1-2a, the recycling cavities are substantially one-dimensional, extending across the output area 16 in adjacent strips that run parallel to the x-axis. The transflector 32 is shaped to form the depicted concave structures in the y-z sectional plane, but in an orthogonal x-z sectional plane the transflector is substantially straight and flat. Stated differently, the transflector exhibits simple curvature. In other embodiments, the transflector can exhibit compound curvature, wherein it is shaped to form concave structures in both the y-z and x-z sectional planes.

Back reflector 30 is preferably highly reflective for enhanced panel efficiency. For example, the back reflector may have an average reflectivity for visible light emitted by the light sources of at least 90%, 95%, 98%, or 99% or more. The back reflector can be a predominantly specular, diffuse, or combination specular/diffuse reflector, whether spatially uniform or patterned. In some cases the back reflector can be made from a stiff metal substrate with a high reflectivity coating, or a high reflectivity film laminated to a supporting substrate. Suitable high reflectivity materials include, without limitation: Vikuiti™ Enhanced Specular Reflector (ESR) multilayer polymeric film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; and White Refstar™ films and MT films available from Mitsui Chemicals, Inc. The back reflector may be substantially flat and smooth, or it may have a structured surface associated with it to enhance light scattering or mixing. Such a structured surface can be imparted (a) on the reflective surface of the back reflector, or (b) on a transparent coating applied to the reflective surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface such as with a stamping operation. In the latter case, a transparent film having a structured surface can be laminated to a flat reflective surface, or a transparent film can be applied to the reflector and then afterwards a structured surface imparted to the top of the transparent film.

The back reflector can be a continuous unitary (and unbroken) layer on which the light source(s) are mounted, or it can be constructed discontinuously in separate pieces, or discontinuously insofar as it includes isolated apertures, through which light sources can protrude, in an otherwise continuous layer. For example, strips of reflective material can be applied to a substrate on which rows of LEDs are mounted, each strip having a width sufficient to extend from one row of LEDs to another, and having a length dimension sufficient to span between opposed borders of the backlight's output area.

Sides and ends of the recycling cavities located along the outer boundary of the output area 16 are preferably lined or otherwise provided with high reflectivity vertical walls to reduce light loss and improve recycling efficiency. Two opposed side walls can be seen at the left and right extremities of FIG. 2; two opposed end walls, one of which is visible in FIG. 2, are orthogonal to the side walls in the depicted embodiment. The same reflective material used for the back reflector can be used to form these walls, or a different reflective material can be used. In exemplary embodiments the side walls are diffusely reflective.

The transflector is or comprises a structure such as a film that partially transmits and partially reflects incident light, where the partial transmission is high enough to permit efficient extraction of light through the transflector, but the partial reflection is also high enough to support light recycling when combined with a back reflector. A variety of different films can be used, as discussed below, with the optimal geometry and characteristics in general being different for each, and being a function of the light sources used and the back reflector, so as to achieve optimal luminance, luminance uniformity (source hiding), and color mixing. (In some cases the backlight designer may be presented with a particular recycling cavity design, such as a cavity module discussed below, and may then select suitable sources for use with the given cavity.) Some suitable films will now be explained further, but the discussion is not intended to be limiting, and any of the described films can be used singly or in combination with others to produce the desired transmission and reflection properties. For combinations of films, the films may or may not be attached to each other. If they are attached, any known attachment mechanisms may be used, and they may be attached over their entire major surfaces or only at discrete points or lines. If adhesives are used, the adhesive can be transparent, diffusive, and/or birefringent.

Some of the films suitable for use as a transflector fall into categories referred to herein as semi-reflective films and light deflecting films.

Generally, semi-reflective films refer to films and the like that reflect on the order of 30 to 90% of normally incident visible light, and have low enough absorption that they transmit a substantial portion, preferably substantially all, of the remaining (non-reflected) light. Reflection and transmission can be specular, diffuse, or a combination thereof, whether spatially uniform or patterned. Diffuse reflection can be produced using surface diffusers (including holographic diffusers), bulk diffusers, or both. The appropriate level of reflectivity can depend on a variety of factors including the number of light sources and their placement on or at the back reflector, the intensity and the emission profile (angular distribution of intensity) of the source(s), the depth of the recycling cavity, the desired degree of brightness and color uniformity in the output of the backlight, and the presence or absence of other components such as a diffuser plate or a top film stack in the backlight. Higher reflectivity films used for the transflector tend to enhance brightness uniformity and color uniformity of the backlight at the expense of efficiency. The decrease in efficiency occurs because the average number of reflections within the recycling cavity increases, and each reflection is associated with at least some loss. As mentioned previously, it is desirable to minimize visible light absorption not only of the transflector, but also of the back reflector and any reflective side walls.

One example of a semi-reflective film suitable as a transflector is a thin metallized mirror, where the metal coating is thin enough to transmit some visible light. The thin metal coating can be applied to a film or to a plate substrate.

Another example of a semi-reflective film is referred to in the art as a controlled transmission mirror film (CTMF). Such a film is made by applying diffusely reflective coatings or layers to both sides of a multilayer interference mirror stack, such as the ESR mirror film mentioned above. Another example of a semi-reflective film is a multilayer polymer mirror film that has been flame embossed to disrupt the multilayer interference stack in some places by brief exposure to a flame.

Reflective polarizers are still other examples of a semi-reflective films. Such polarizers, which include cholesteric polarizers, multilayer polymeric polarizers made by coextrusion and stretching techniques, wire grid polarizers, and diffuse blend polarizers having a continuous/disperse phase construction, transmit nominally half of the light from an unpolarized source (corresponding to a first polarization state) and reflect nominally the other half (corresponding to an orthogonal second polarization state). Examples include any of the dual brightness enhancement film (DBEF) products and any of the diffusely reflective polarizing film (DRPF) products available from 3M Company under the Vikuiti brand. See also, for example, the reflective films disclosed in U.S. Pat. No. 5,882,774 (Jonza et al.) and U.S. Pat. No. 6,111,696 (Allen et al.), and in U.S. Patent Publication 2002/0190406 (Merrill et al.). If one reflective polarizing film is inadequate, two or more such films can be combined and then shaped to form the concave structure(s).

Non-polarizing diffuse reflectors are still more examples of semi-reflective films. Such reflectors can be made by dispersing specularly reflective particles or flakes in a low absorption, transparent polymer matrix, forming a film or other body. The reflective particles or flakes can be distributed through the thickness of a thick film, or can be disposed on a surface of a substrate as a thin curable coating. Numerous other diffuse reflector constructions and methods of making are also known. Diffuse coatings can be applied to reflectors or other bodies by ink-jet printing, screen printing, and other known techniques. Diffuse adhesives can also be used, where the diffusion is produced by refractive index mismatched particles, or air voids. Diffuse reflectors used for the transflector preferably have low absorption and average transmission values over visible wavelengths from 20% to 80%.

Semi-reflective films also include reflective films that have been provided with a pattern of fine holes or apertures to increase transmission and reduce reflection. This can be done by simply perforating a reflective film in a desired pattern. Virtually any of the reflective films discussed herein can be used as a starting material, and then converted or processed to provide the perforations or other apertures. U.S. Patent Application Publications US 2004/0070100 (Strobel et al.) and US 2005/0073070 (Getschel et al.) teach suitable techniques for flame-perforating films. The pattern of holes or apertures can be uniform or non-uniform, and in the latter case both the position and the hole size can be random or pseudo-random. In one example, a sheet of Vikuiti™ ESR film is perforated with uniformly spaced round holes, the holes positioned in a hexagonal array with a hole-to-hole spacing equal to a multiple of the hole diameter. From a manufacturing standpoint it is desirable not to have to align the transflector with the light source(s), and thus it can be advantageous to use a uniform hole pattern and during construction of the backlight make no attempt to register the light source(s) in any particular way relative to the pattern. In certain backlight configurations, however, it may be acceptable to use a non-uniform pattern of holes and then position the transflector such that certain features of the non-uniform pattern, such as areas having fewer holes or smaller holes than other areas, are aligned with the light sources. Further, in some embodiments, the transflector can include a reflective film such as ESR that is formed into individual strips or discrete segments. See, e.g., US 2004/0233665 (West et al.).

Generally, light deflecting films suitable as a transflector in the disclosed backlights refer to films and the like having minute structures arranged to form a structured surface or the like that reflects and transmits light as a function of the direction of incidence of the light. One or both sides of the film can have such a structured surface. Useful structures include linear prisms, pyramidal prisms, cones, and ellipsoids, which structures may be in the form of projections extending out from a surface or pits extending into the surface. The size, shape, geometry, orientation, and spacing of the structures can all be selected to optimize the performance of the transflector, recycling cavity, and backlight, and the individual structures can be symmetric or asymmetric. The structured surface can be uniform or non-uniform, and in the latter case both the position and size of the structures can be random or pseudo-random. Disrupting regular features by periodic or pseudo-random variation of size, shape, geometry, orientation, and/or spacing may be used to adjust the color and brightness uniformity of the backlight. In some cases it may be beneficial to have a distribution of small and large structures and position the light deflecting film such that the smaller structures are aligned generally over the light sources and the larger structures are positioned elsewhere.

Examples of suitable light deflecting films include commercial one-dimensional (linear) prismatic polymeric films such as Vikuiti™ brightness enhancement films (BEF), Vikuiti™ transmissive right angle films (TRAF), Vikuiti™ image directing films (IDF), and Vikuiti™ optical lighting films (OLF), all available from 3M Company, as well as conventional lenticular linear lens arrays. In the case of these one-dimensional prismatic films, the prismatic structured surface preferably faces downward toward the light sources (negative z direction in FIG. 2), and if the transflector is simply curved such that it forms a concave structure in a first sectional plane (such as the y-z plane) but not in an orthogonal second sectional plane (such as the x-z plane), the one-dimensional prismatic film is preferably oriented such that the linear prisms of its structured surface extend perpendicular to the first plane (e.g., the y-z plane) and parallel to the second plane (e.g. the x-z plane). Further examples of light deflecting films, where the structured surface has a two-dimensional character, include: cube corner surface configurations such as those disclosed in U.S. Pat. No. 4,588,258 (Hoopman), U.S. Pat. No. 4,775,219 (Appeldorn et al.), U.S. Pat. No. 5,138,488 (Szczech), U.S. Pat. No. 5,122,902 (Benson), U.S. Pat. No. 5,450,285 (Smith et al.), and U.S. Pat. No. 5,840,405 (Shusta et al.); unsealed cube corner sheeting such as 3M™ Scotchlite™ Reflective Material 6260 High Gloss Film and 3M™ Scotchlite Reflective Material 6560 High Gloss Sparkle Film, available from 3M Company; inverted prism surface configurations such as described in U.S. Pat. No. 6,287,670 (Benson et al.) and U.S. Pat. No. 6,280,822 (Smith et al.); structured surface films disclosed in U.S. Pat. No. 6,752,505 (Parker et al.) and patent publication US 2005/0024754 (Epstein et al.); and beaded retroreflective sheeting.

The light deflecting films can be used alone or in combination with other suitable transflectors. If used in combination with a different type of transflector, the light deflecting film can be positioned to be on the interior of the recycling cavity (closest to the light sources), and the other film, which may be a semi-reflecting film (for example, a diffusing film) or another light deflecting film, can be positioned on the exterior of the recycling cavity. If two or more linear prismatic light deflecting films are combined, they can be aligned, misaligned, or "crossed" such that the prism direction of one film is perpendicular to the prism direction of the other film.

Returning now to FIGS. 2 and 2a, the discrete light sources 20, 22 are shown schematically. In most cases, these sources are compact light emitting diodes (LEDs). In this regard, "LED" refers to a diode that emits light, whether visible, ultraviolet, or infrared. It includes incoherent encased or encapsulated semiconductor devices marketed as "LEDs", whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. More discussion of packaged LEDs, including forward-emitting and side-emitting LEDs, is provided below.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. For example, in some applications it may be desirable to replace the row of discrete light sources 20 seen in FIG. 1a with a different light source such as a long cylindrical CCFL, or with a linear surface emitting light guide emitting light along its length and coupled to a remote active component (such as an LED die or halogen bulb), and to do likewise with the row of discrete sources 22. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED.

Turning now to FIGS. 3a-g, we see there a small sample of the wide variety of different geometrical configurations with which one can construct suitable direct-lit backlights. The figures are all represented as elevational views directed along the x-axis, which is perpendicular to the plane of the figures. However, the figures can also be interpreted to represent elevational views directed along the orthogonal y-axis, thus generally depicting both embodiments in which the transflector has simple curvature in the y-z plane, as well as those in which the transflector has compound curvature in both the y-z and x-z planes. In this regard, "curvature" should be understood broadly, and is not limited to circular geometric arcs or even to curved shapes.

Figure 3A:
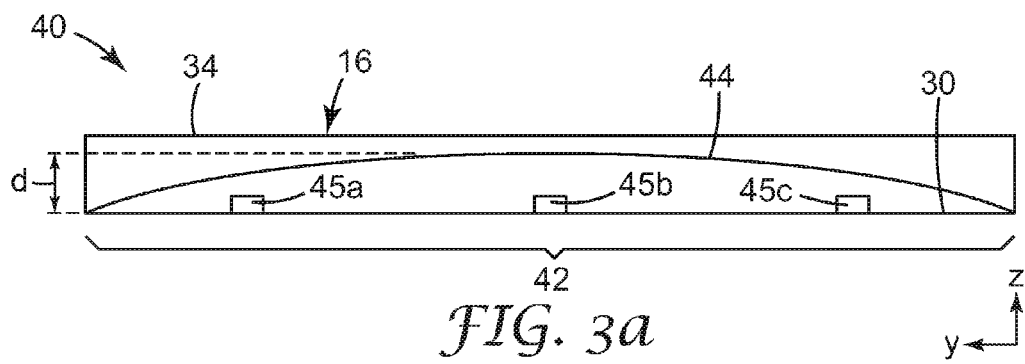
FIGS. 3a-g are schematic side elevational views of additional backlights.

FIG. 3a shows a direct-lit backlight 40 having only one recycling cavity 42 formed by a single concave structure in a transflector 44, in combination with the back reflector 30. The recycling cavity has a depth d as shown and a length and width substantially equal to the length and width of the output area 16, which now is located at the front surface of diffuser plate 34. Three light sources 45a, 45b, 45c are disposed in the cavity 42, and each may represent a single light source or a row of light sources extending parallel to the x-axis. Depending on the brightness and spatial and angular distribution of emitted light, any one or two of sources 45a, 45b, 45c may be omitted and still provide acceptable brightness and brightness uniformity at the output area 16.

Figure 3B:
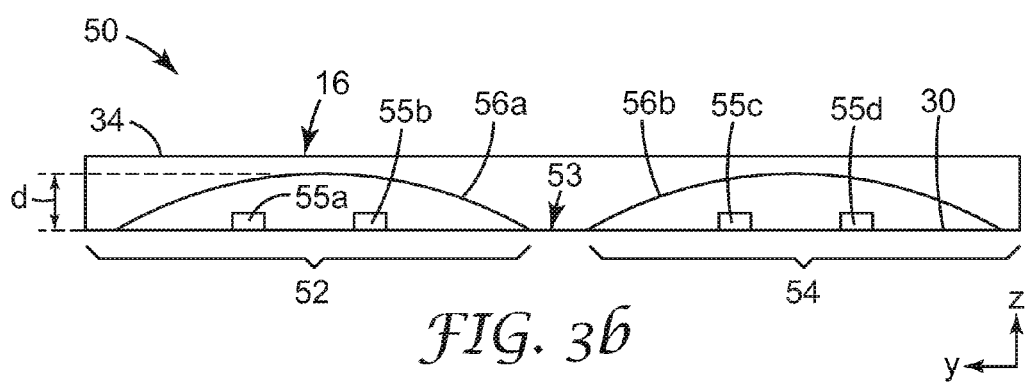

FIG. 3b shows a direct-lit backlight 50 having two recycling cavities 52, 54 formed by two concave structures in a transflector 56, in combination with the back reflector 30. The transflector 56 is shown in two parts, 56a and 56b, corresponding to the two concave structures. These parts may or may not be connected by a portion of the transflector in the intermediate region 53. As seen by the presence of the intermediate region 53, and the region to the left of cavity 52 and the region to the right of cavity 54, the cavities 52, 54 do not collectively fill the entire output area 16. Nevertheless, the cavities 52, 54 are still sized to substantially fill the output area, preferably accounting for 75%, 80%, or 90% or more of the plan view area of the output area 16. Regions disposed behind the output area 16 that lack concave recycling cavities, such as intermediate region 53, collectively amount to a small percentage (less than 25%, 20%, or 10%, and preferably about 0%) of the plan view area of the output area. These regions may have little or no detrimental effect on the brightness uniformity across the output area 16 because of the proximity of the recycling cavit(ies), the angular distribution of light emitted by the recycling cavit(ies), and the position of the output area above the recycling cavit(ies) (e.g., the placement of diffuser plate 34). To the extent the regions are present, in exemplary embodiments they are distributed preferentially near or along the periphery of the output area 16 and away from the central portion of the output area. Each recycling cavity has a depth d as shown. Two light sources 55a, 55b are disposed in cavity 52, and two light sources 55c, 55d are disposed in cavity 54, but one light source per cavity may also be sufficient. The illustrated light sources may represent a single light source or a row of light sources extending parallel to the x-axis.

Figure 3C:
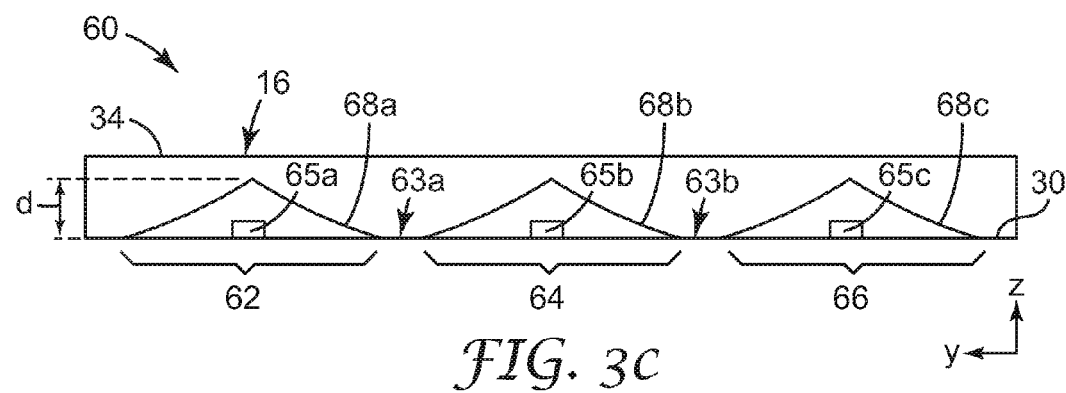

FIG. 3c shows a direct-lit backlight 60 having three recycling cavities 62, 64, 66 formed by three concave structures in a transflector 68, in combination with the back reflector 30. The transflector 68 is shown in three parts, 68a, 68b, and 68c, corresponding to the three concave structures. These parts may or may not be connected by portions of the transflector in the intermediate regions 63a, 63b, the area of which is preferably minimized. Note that the concave structures are each composed of distinct left and right halves, each half having a convex shape relative to the back reflector 30 but two halves together forming a structure that is concave relative to the back reflector. Each recycling cavity has a depth d as shown. Light sources 65a, 65b, 65c are disposed in their respective cavities 62, 64, 66. The illustrated light sources may represent a single light source or a row of light sources extending parallel to the x-axis.

Figure 3D:
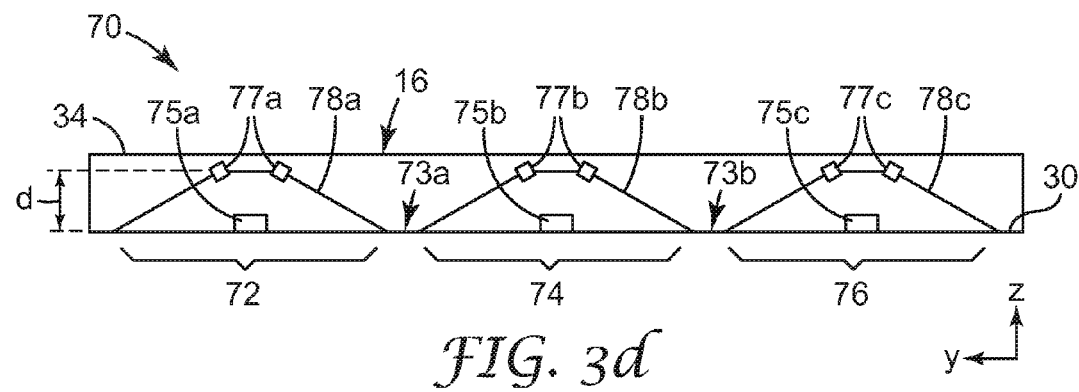

FIG. 3d shows a direct-lit backlight 70 having three recycling cavities 72, 74, 76 formed by three concave structures in a transflector 78, in combination with the back reflector 30. The transflector 78 is shown in three parts, 78a, 78b, and 78c, corresponding to the three concave structures. These parts may or may not be connected by portions of the transflector in the intermediate regions 73a, 73b, the area of which is preferably minimized Note that the concave structures are each composed of distinct left, right, and top portions, the top portions being connected to the other two portions by attachment mechanisms 77. These attachment mechanisms 77 can be of conventional design, for example, a molded plastic frame. Attachment mechanisms 77 can also be transparent or opaque, and can be larger or smaller than the relative size shown in the figure. Each recycling cavity has a depth d as shown. Light sources 75a, 75b, 75c are disposed in their respective cavities 72, 74, 76. The illustrated light sources may represent a single light source or a row of light sources extending parallel to the x-axis.

Figure 3E:
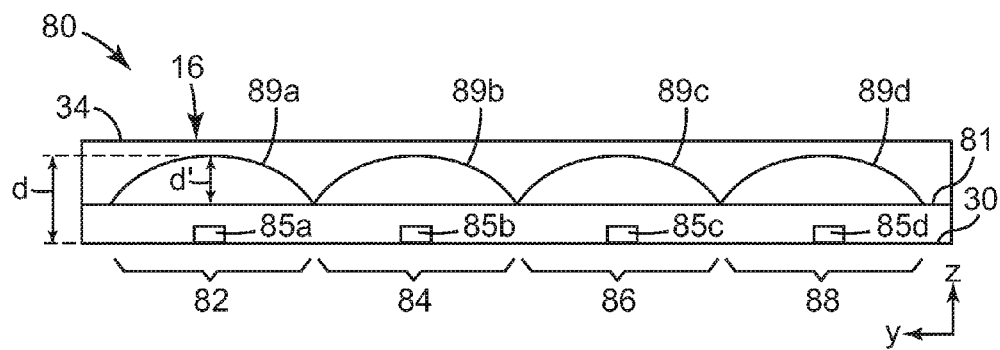

FIG. 3e shows another direct-lit backlight 80, having four recycling cavities 82, 84, 86, 88 formed by four concave structures in a transflector 89, in combination with the back reflector 30. The transflector 89, which rests atop or attaches to a transparent support 81, is shown in four parts, 89a-d, corresponding to the four concave structures. These parts may or may not be part of a continuous transflective film. Each recycling cavity has a depth d as shown. In certain embodiments, the transparent support 81 may have an engineered surface structure facing the light sources 85a-d. Light sources 85a-d are disposed in their respective cavities 82, 84, 86, 88. The illustrated light sources may represent a single light source or a row of light sources extending parallel to the x-axis. In an alternative embodiment transparent support 81 may be replaced with a back reflector having apertures therein to permit the light sources to illuminate the cavities, and back reflector 30 may be replaced with a substrate such as a circuit board on which to mount the light sources. In that case the depth of the recycling cavities decreases to d' as shown.

Figure 3F:
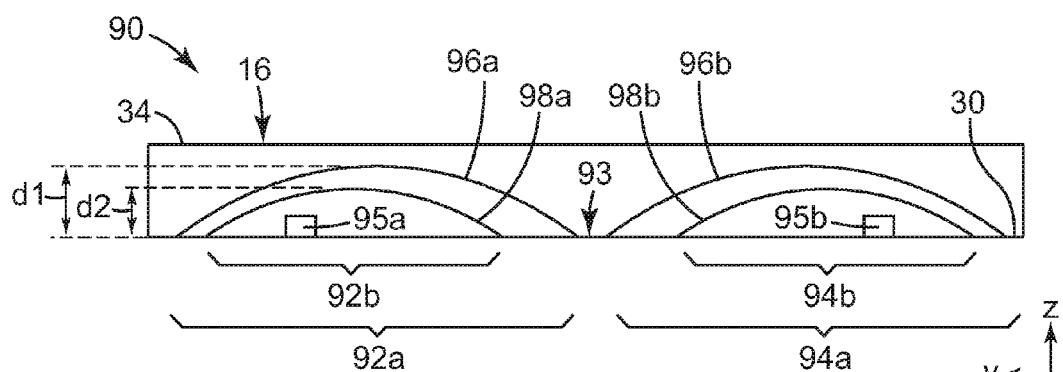

FIG. 3f shows another direct-lit backlight 90, having two outer recycling cavities 92a, 94a and two inner recycling cavities 92b, 94b, the outer cavities being formed by two concave structures in a first transflector 96 in combination with the back reflector 30, and the inner cavities being formed by two concave structures in a second transflector 98 in combination with smaller portions of the same back reflector 30. Transflector 96 is shown in two parts 96a, 96b, which may or may not be connected by a portion of the transflector 96 in an intermediate region 93. Transflector 98 is also shown in two parts 98a, 98b, which likewise may or may not be connected by a portion of the transflector 98 in the intermediate region 93. The outer and inner transflectors can use the same type of transflective material, e.g., a particular semi-reflective film or a particular light deflecting film, or they may use different materials, such as a prismatic light deflecting film for one and a perforated reflector for the other. The outer recycling cavities have a depth d1 as shown. The inner recycling cavities have a smaller depth d2. Light source 95a is disposed in both outer cavity 92a and inner cavity 92b; light source 95b is disposed in both outer cavity 94a and inner cavity 94b. The illustrated light sources may represent a single light source or a row of light sources extending parallel to the x-axis.

Figure 3G:
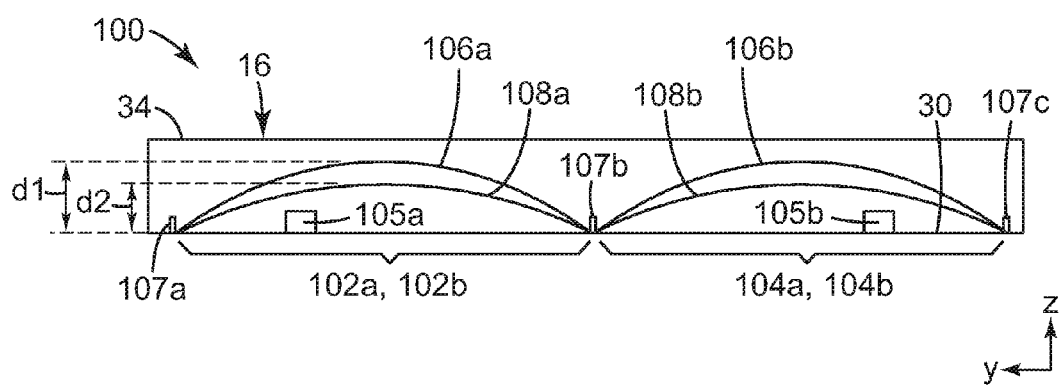

FIG. 3g shows still another direct-lit backlight 100, having two outer recycling cavities 102a, 104a and two inner recycling cavities 102b, 104b, the outer cavities being formed by two concave structures in a first transflector 106 in combination with the back reflector 30, and the inner cavities being formed by two concave structures in a second transflector 108. Transflector 106 is shown in two parts 106a, 106b; transflector 108 is also shown in two parts 108a, 108b. FIG. 3g exemplifies a construction technique in which a concave (and curved) structure is formed by flexing an otherwise flat stiff film and holding it in compression between fixed posts. Thus, transflectors 106a and 108a are held in compression between fixed posts 107a, 107b, resulting in nested cavities of equal width but different depth. Transflectors 106b and 108b are held in compression between fixed posts 107*b*, 107*c*, also resulting in nested cavities of equal width but different depth. The outer and inner transflectors can use the same type of transflective material, e.g., a particular semi-reflective film or a particular light deflecting film, or they may use different materials, such as a prismatic light deflecting film for one and a perforated reflector for the other. The outer recycling cavities have a depth d1, the inner recycling cavities have a smaller depth d2. Light source 105*a* is disposed in both outer cavity 102*a* and inner cavity 102*b*; light source 105*b* is disposed in both outer cavity 104*a* and inner cavity 104*b*. The illustrated light sources may represent a single light source or a row of light sources extending parallel to the x-axis.

Figure 4:
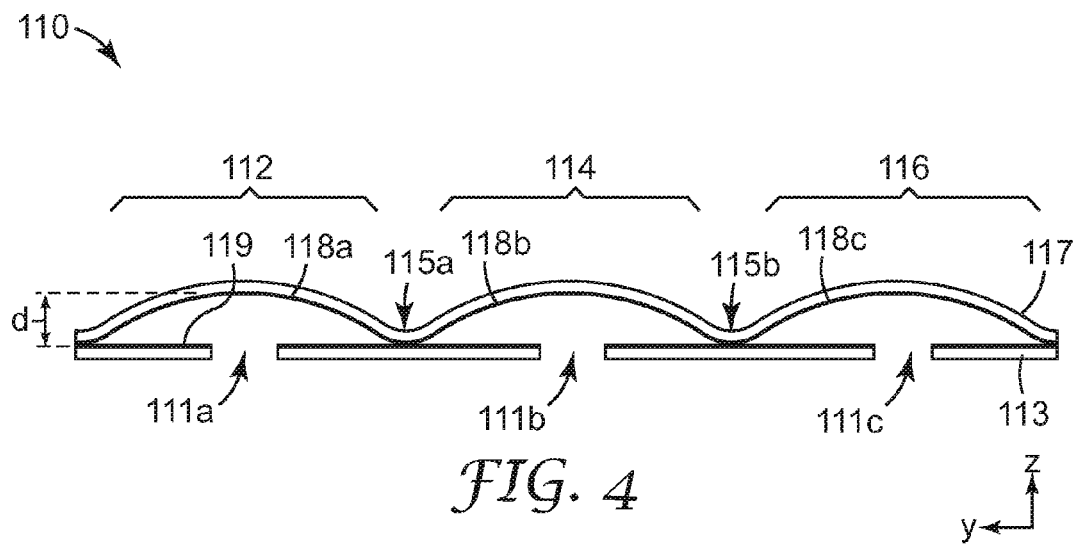
FIG. 4 is a schematic sectional view of a recycling cavity module for use in a backlight.

FIG. 4 shows a recycling cavity module 110. Module 110 has three recycling cavities 112, 114, 116, formed by three concave structures in a transflector 118, in combination with a back reflector 119. The transflector 118, which is coated or laminated to a stiff transparent support 117, is shown in three parts, 118*a-c*, corresponding to the three concave structures. The transflector 118 is shown to be continuous, but it can also be discontinuous, for example, omitted from intermediate regions 115*a*, 115*b*, or from selected portions of the concave structures. An adhesive or other bonding mechanism can be used in the regions 115*a*, 115*b* and at the left and right extremities of the module 110 to secure the transflector 118 to the back reflector 119. Back reflector 119 is coated or laminated to a stiff support 113. The combination back reflector 119/support 113 has apertures 111*a-c* therein, which may be physical holes or slots, or alternatively portions of light-transmissive film or other material. The apertures are sized to receive suitable light sources so that the module 110 can be simply dropped in place over an array of light sources for fast and easy backlight construction. A single module 110 can be used to construct a backlight having three light sources or three rows of light sources; multiple modules can also be used on larger backlights, e.g., two modules 110 can be used side-by-side to construct a backlight having six light sources or six rows or light sources. Each recycling cavity has a depth d as shown.

Figure 5:
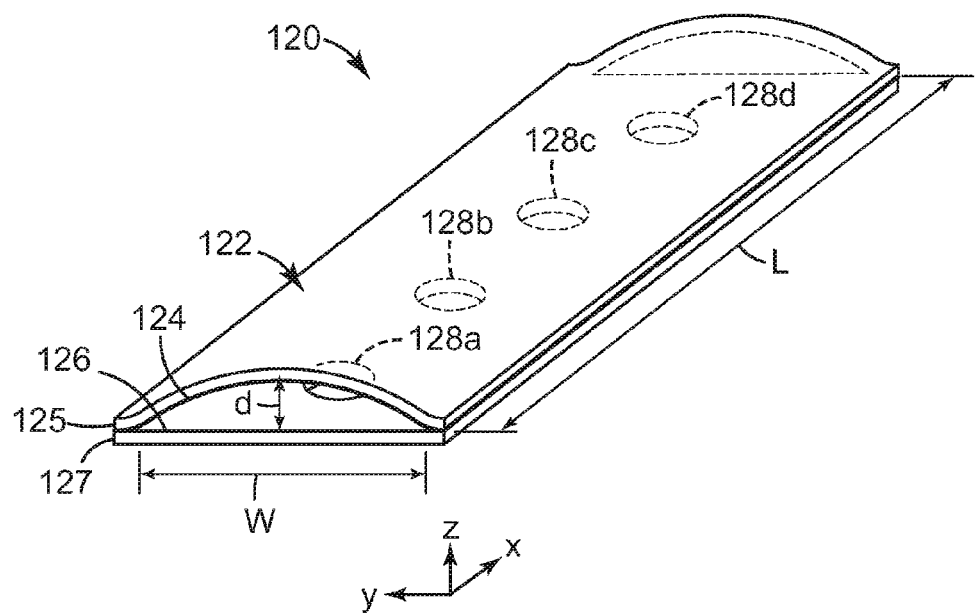
FIG. 5 is a perspective view of another recycling cavity module for use in a backlight.

FIG. 5 shows a recycling cavity module 120 similar to the module of FIG. 4, except that module 120 has only one recycling cavity 122. Cavity 122 is formed by one concave structure in a transflector 124 in combination with a back reflector 126. The transflector 124 can be coated or laminated to a stiff transparent support 125. The transflector 124 is shown to be continuous, but it can also be discontinuous, for example, omitted from the opposed edges of the module extending parallel to the x-axis, or from selected portions of the concave structure. An adhesive or other bonding mechanism can be used along the edges of the module 110 to secure the transflector 124 to the back reflector 126. Back reflector 126 is coated or laminated to a stiff support 127. The combination back reflector 126/support 127 has apertures 128*a-d* therein, which may be physical holes, or alternatively portions of light-transmissive film or other material. The apertures are sized to receive suitable light sources so that the module 120 can be simply dropped in place over an array (in this case, a row) of light sources for fast and easy backlight construction. A single module 120 can be used to construct a backlight having one row of four light sources; multiple modules 120 can also be used on larger backlights, e.g., placed end-to-end and/or side-by-side to construct backlights having n rows of four light sources, where n is any positive integer, or n rows of 4 m light sources, where m is also any positive integer. The recycling cavity 122 has a depth d, and a length L and a width W as shown.

Modules of differing design, and more generally cavities of differing design, can be mixed and matched as desired in a given backlight. Multiple cavities in a given backlight need not have the same shape in plan view, they need not have the same length, width, or depth, they need not be oriented in the same way, and they need not use the same transflector material or back reflector material. Also, whether or not the cavities have the same geometrical and optical properties, they need not have the same number of light sources or the same type of light sources. The sizes, positions, orientations, and other features of the cavities (and of cavity modules) can be selected to yield the desired characteristics of the backlight.

The recycling cavities need not have a rectangular outline in plan view. For example, recycling cavity 122 of FIG. 5 can be modified by making the cavity wider in the center proximate apertures 128*b*, 128*c* and narrower at the ends proximate apertures 128*a*, 128*d* to produce a barrel-shaped plan view outline, or the cavity can be made narrower in the center and wider at the ends to produce an hour-glass-shaped plan view outline.

Figure 6:
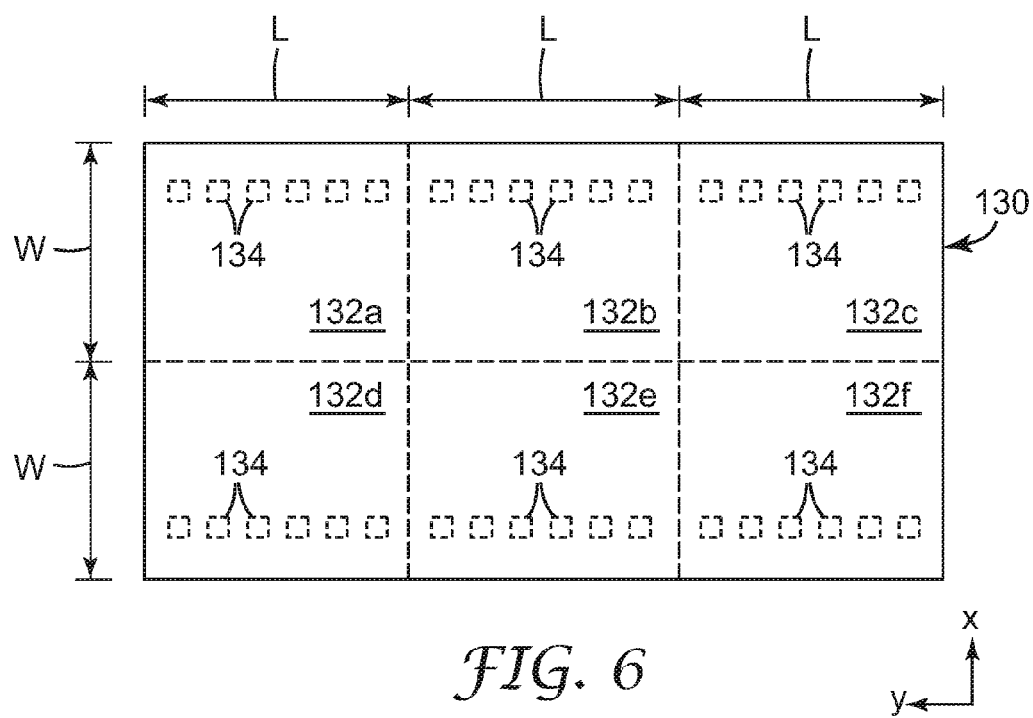
FIGS. 6 and 7 are front views of different backlights, showing the placement of multiple light recycling cavities behind the output area of the backlights.
Figure 7:
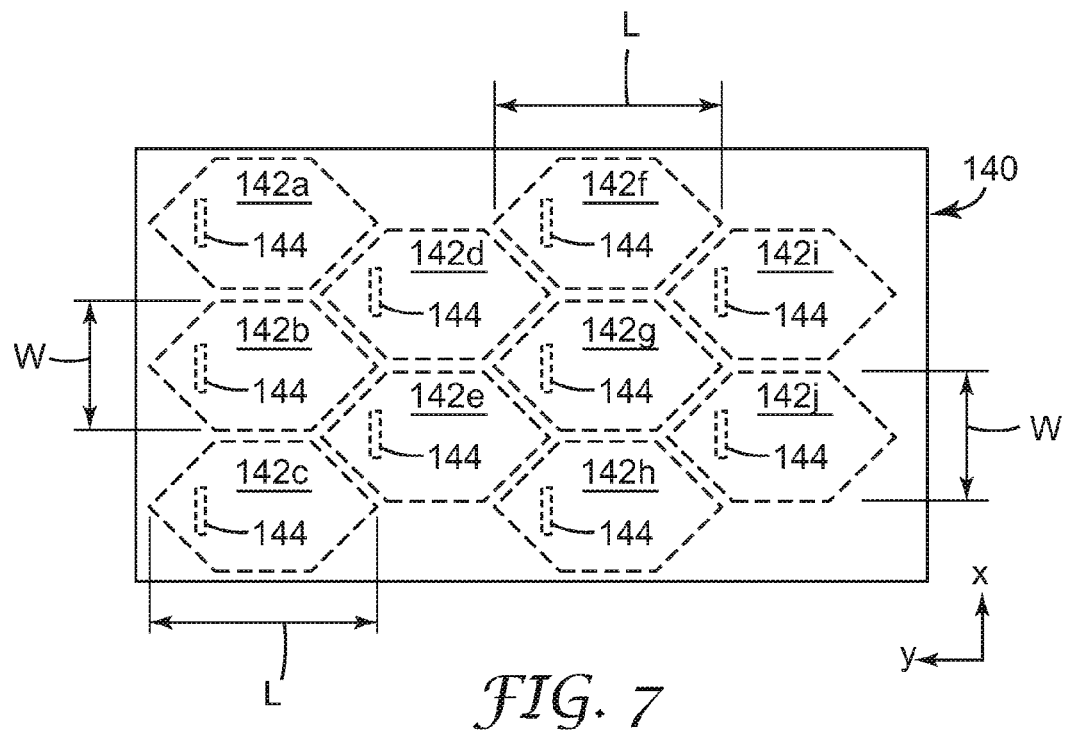

FIGS. 6 and 7 are front or plan views of different direct-lit backlights, showing the placement of multiple light recycling cavities behind the output area of the panels. The output areas of each backlight have a 16:9 aspect ratio, which is currently popular in LCD TVs. In FIG. 6, a backlight output area 130 is substantially filled by an array of six recycling cavities 132*a-f*. Each recycling cavity is formed by a transflector shaped to form a concave structure facing a back reflector. The transflector is shaped to define one concave structure in the x-z plane and another concave structure in the orthogonal y-z plane, the former defining a width W and the latter defining a length L of each recycling cavity. Light sources 134 are disposed in the recycling cavities or behind the back reflector.

FIG. 6 can also be construed to show embodiments in which the transflector has simple curvature to define one or more linear tunnel-like structures, but where vertical partitions are disposed between the transflector and the back reflector to segment a recycling cavity into separate zones or sub-cavities. For example, the transflector may form a single concave structure in the x-z plane between the top and bottom edges of output area 130, forming a recycling cavity of width 2W and length 3L (where W and L are as depicted in FIG. 6), except that vertical partitions, preferably made of a highly reflective material, whether specular or diffuse, are arranged between the transflector and the back reflector as shown by the broken lines to define distinct zones or cavities 132*a-f*. As another example, the transflector may form two adjacent concave structures in the x-z plane to form two recycling cavities, each having a width W and a length 3L (where W and L are as depicted in FIG. 6), except that vertical partitions are disposed between the transflector and the back reflector to segment the first cavity into three cavities 132*a-c*, and to segment the second cavity into three cavities 132*d-f*. In still another example, the transflector may form three adjacent concave structures in the y-z plane to form three recycling cavities, each having a width L and a length 2W (where W and L are as depicted in FIG. 6), except that a vertical partition is disposed between the transflector and the back reflector to segment each cavity into two cavities.

In FIG. 7, a panel output area 140 is substantially filled by an array of ten hexagonal recycling cavities 142*a-j*. Each recycling cavity is formed by a transflector shaped to form a concave structure facing a back reflector. The transflector is shaped to define one concave structure in the x-z plane and another concave structure in the orthogonal y-z plane, the former defining a width W and the latter defining a length L of each recycling cavity. Light sources 144 are disposed in the recycling cavities or behind the back reflector.

Besides rectangular and hexagonal shapes, other plan-view shapes can be used for the recycling cavities, whether they are simply curved or complex curved. Polygons (triangles, trapezoids, pentagons, etc.), circles, ellipses, and any other desired shapes are contemplated. The geometry can be tailored to achieve high efficiency and brightness and color uniformity in the backlight.

As mentioned previously, the recycling cavities formed by the concave transflector and back reflector are desirably relatively shallow in the z-direction (i.e., small depth d) and relatively wide in a transverse direction. Depth d of a particular cavity refers to the maximum separation in that cavity between the back reflector and the transflector along an axis perpendicular to the output area, i.e., along the z-direction. Width (W) of a cavity refers to a lateral dimension of the cavity measured as follows: beginning with the shape of the cavity in plan view (e.g., FIGS. 6 and 7), the width of the cavity is the minor dimension of the smallest rectangle that can circumscribe the plan view cavity shape. The disclosed recycling cavities desirably have widths W greater than 2d, preferably at least 5d or 10d or more. Length (L) of a cavity refers to the major dimension of the smallest rectangle that can circumscribe the plan view cavity shape. In special cases the smallest rectangle may be a square, in which case L=W.

Backlights utilizing more than one of the disclosed recycling cavities, and particularly those having zones or arrays of distinct cavities, each of which is illuminated by its own light source(s) which are separately controlled or addressable relative to light source(s) in neighboring cavities, can be used with suitable drive electronics to support dynamic contrast display techniques and color sequential display techniques, in which the brightness and/or color distribution across the output area of the backlight is intentionally non-uniform. Thus, different zones of the output area can be controlled to be brighter or darker than other zones, or the zones can emit in different colors, simply by appropriate control of the different light sources in the different recycling cavities.

The disclosed concave recycling cavities can be fabricated for backlights using a wide variety of assembly methods and techniques.

In one method, a single piece of transflective film spans the entire width of a backlight enclosure, where the edges of the film are wedged between or are physically affixed to sidewalls of the enclosure to form a concave tunnel-like structure. This method is particularly suited to relatively small displays.

In the case of thin and wide backlight units, it can be advantageous to use multiple concave tunnel-like structures. Scoring a transflective film, i.e., cutting through a portion of the film's thickness along one or more lines, has been found to be a convenient technique for defining the boundaries of the concave structures. Another useful technique is creasing the transflective film by folding it along one or more lines. Scoring and creasing can facilitate the assembly of multiple concave structures from a single film by providing defined positions at which the film is predisposed to fold. Scoring can be accomplished by any known scoring technique, including laser methods, thermal methods such as hot wire or hot knife, and known kiss-cutting techniques.

When using multiple tunnel-like structures formed from a single film, physical attachment of the film to the backplane, sidewalls, or both the backplane and sidewalls of the backlight enclosure can provide the film with a stable and robust structure. Examples of methods for physical attachment of a concave film to a backlight include, but are not limited to: pinning scored sections of the film to the backplane via rivets, screws, staples, thermal or ultrasonic spot welds, plastic pins that snap into the backplane (which may also be used to support the diffuser plate, as in the Sony™ Qualia LED LCD TV), pins that snap into the sidewalls of the backlight and pin the scored areas of the film to the backplane, adhesive strips on the backplane, and the like.

Edges of the concave film can be attached to positions or slots molded into the sidewall reflectors of the backlight enclosure that help define the shape of the concave structure. Alternatively, the film can be prepared to be rigid enough so that the concave structure can snap into predefined slots in the sidewalls or reflective backplane. The stiffness or rigidity of a transflector can be enhanced, in general, by corrugating at least a portion of the transflector. A transflector that lacks sufficient stiffness by itself can also be combined with (e.g., placed atop) a transparent support having a suitable surface shape.

Another approach to secure a scored film into a backlight enclosure involves the use of supporting members, which can be molded into the sidewall structure of the enclosure or snap into the sidewalls of the enclosure. This method can utilize transparent polymer rods that snap into predefined positions in the sidewalls of the enclosure, spanning a length or width dimension of the backlight, thus providing guides through which a transflector can be woven or threaded, with the film being secured at its edges using techniques described above. Alternatively, the rods can be replaced with fine gauge wire. This approach can be particularly useful for making asymmetric concave structures, where the film would normally resist taking on an asymmetric shape.

Another approach to form the concave structures in the transflector is to place plastic pins at predetermined locations on the back side of a front diffuser plate corresponding to places at which the transflector is intended to contact or nearly contact the back reflector. During backlight assembly, the pins can contact a flexible transflective film to form the transflector, which can be attached at its edges to the backlight enclosure, into one or more concave shapes defined by the positions of the pins.

Other methods for forming the concave structures involve fabricating modules that are separate from the backlight. A module similar to that shown in FIG. 4, can be made wherein a transflector is attached at points to unconnected reflective backplane pieces which, when brought together, leaves an aperture for the light source(s). Separate pieces of the back reflector, such as shown in FIG. 4, can also be connected by z-fold hinges such that when the hinges are extended, the transflector can lie flat for shipping purposes, and when the hinges are folded, the concave structure is formed, leaving apertures for the light source(s). Another type of module is shown in FIG. 5, where the back reflector can be a reflective film such as ESR film from 3M Company with a defined length and having apertures through which light sources can protrude. A transflective film wider than the back reflector film is introduced, and the two films are bonded or welded along two opposed edges, forming a concave, tunnel-like structure. The module can be attached to the backlight enclosure by conventional means such as an adhesive applied to the back surface of the back reflector.

Other methods for forming concave structures are described in commonly assigned U.S. Application entitled "Methods of forming Direct-lit Backlights having Light Recycling Cavity with Concave Transflector" 60/711,523, filed on even date herewith.

Figure 8:
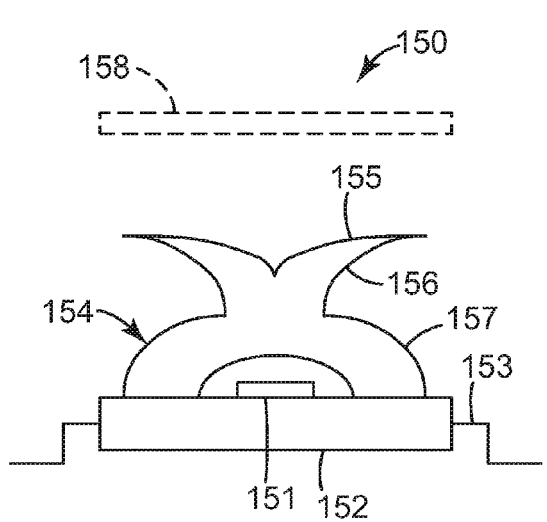
FIGS. 8-11 are views of various packaged LEDs useable as light sources in the disclosed backlights.
Figure 9:
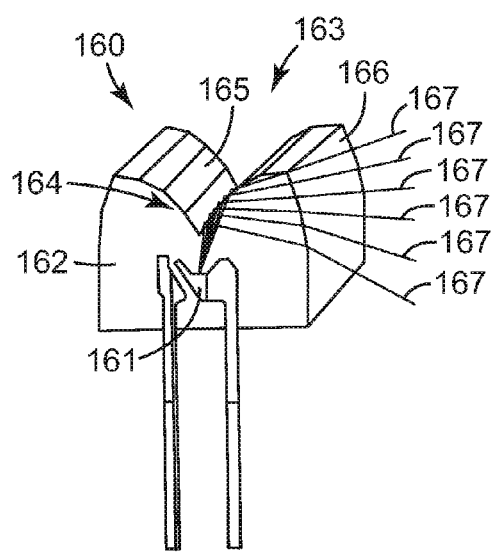
Figure 10:
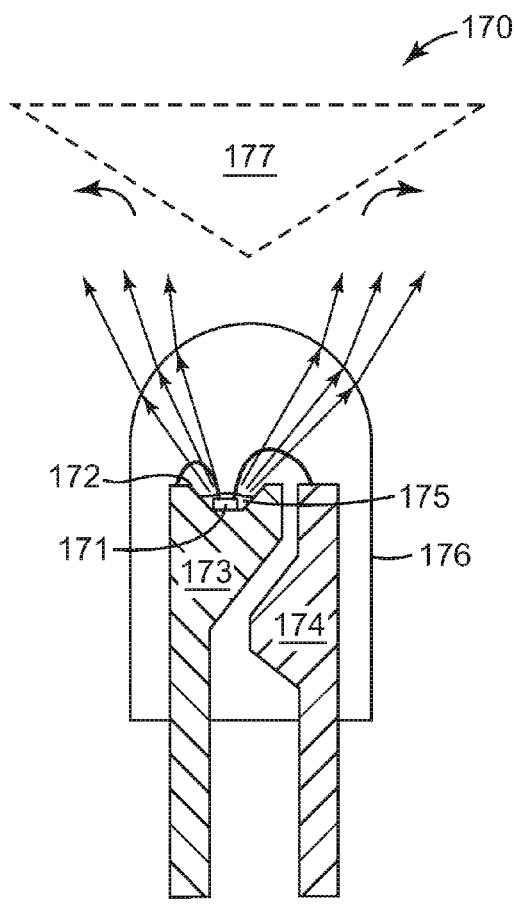
Figure 11:
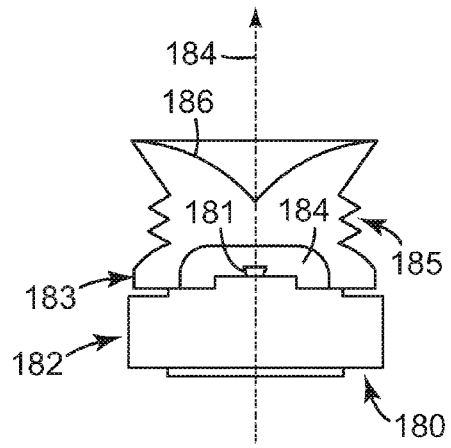

FIGS. 8-11 show views of some light sources that are useable in the disclosed backlights, but they are not intended to be limiting. The illustrated light sources comprise packaged LEDs. The light sources of FIGS. 8, 9, and 11 show side-emitting LED packages, where light from an LED die is reflected and/or refracted by an integral encapsulant or lens element to provide peak light emission in a generally lateral direction rather than forward along a symmetry axis of the source. The light source of FIG. 10 can be forward emitting or side-emitting, depending on whether an optional deflector is included.

In FIG. 8, a light source 150 includes an LED die 151 carried by a frame 152 and electrically connected to leads 153. Leads 153 are used to electrically and physically connect the light source 150 to a circuit board or the like. A lens 154 is attached to frame 152. The lens 154 is designed such that light emitted into an upper section of the lens is totally internally reflected on an upper surface 155 such that it is incident on a bottom surface 156 of the upper section and refracted out of the device. Light emitted into a lower section 157 of the lens is also refracted out of the device. Light source 150 can also include an optional diverter 158, such as a disk of reflective material, mounted above the lens 154 or attached to the upper surface 155. See also U.S. Patent Application Publication US 2004/0233665 (West et al.).

In FIG. 9, a light source 160 includes an LED die (not shown) mounted on a lead frame 161. A transparent encapsulant 162 encapsulates the LED die, lead frame 161, and a portion of the electrical leads. The encapsulant 162 exhibits reflection symmetry about a plane containing an LED die surface normal. The encapsulant has a depression 163 defined by curved surfaces 164. Depression 163 is essentially linear, centered on the plane of symmetry, and a reflective coating 165 is disposed on at least a portion of surface 164. Light emanating from the LED die reflects off reflective coating 165 to form reflected rays which are in turn refracted by a refracting surface 166 of the encapsulant, forming refracted rays 167. See also U.S. Pat. No. 6,674,096 (Sommers).

In FIG. 10, a light source 170 includes an LED die 171 disposed in a recessed reflector area 172 of a lead frame 173. Electrical power is supplied to the source by the lead frame 173 and another lead frame 174, by virtue of wire bond connections from the lead frames to the LED die 171. The LED die has a layer of fluorescent material 175 over it, and the entire assembly is embedded in a transparent encapsulation epoxy resin 176 having a lensed front surface. When energized, the top surface of the LED die 171 produces blue light. Some of this blue light passes through the layer of fluorescent material, and combines with yellow light emitted by the fluorescent material to provide a white light output. Alternately, the layer of fluorescent material can be omitted so that the light source emits only the blue light (or another color as desired) produced by the LED die 171. In either case, the white or colored light is emitted in essentially a forward direction to produce peak light emission along a symmetry axis of the light source 170. If desired, however, light source 170 can optionally include a deflector 177 having reflective surfaces to redirect light in generally sideways or lateral directions, thus converting the light source 170 to be a side-emitter. Deflector 177 may have mirror symmetry with respect to a plane perpendicular to the page, or may have rotational symmetry about a vertical axis coincident with a symmetry axis of the encapsulating resin 176. See also U.S. Pat. No. 5,959,316 (Lowery).

In FIG. 11, a light source 180 has an LED die 181 supported by a package base 182. A lens 183 is coupled to base 182, and a package axis 184 passes through the center of base 182 and lens 183. The shape of lens 183 defines a volume 184 between LED die 181 and lens 183. The volume 184 can be filled and sealed with silicone, or with another suitable agent such as a resin, air or gas, or vacuum. Lens 183 includes a sawtooth refractive portion 185 and a total internal reflection (TIR) funnel portion 186. The sawtooth portion is designed to refract and bend light so that the light exits from lens 183 as close to 90 degrees to the package axis 184 as possible. See also U.S. Pat. No. 6,598,998 (West et al.).

In addition to the diverters depicted in FIGS. 8 and 10, the sources can utilize other diverters, including the bifunctional diverters described in commonly assigned U.S. Application entitled "Direct-Lit Backlight Having Light Sources With Bifunctional Diverters" 60/711,522, filed on even date herewith.

Multicolored light sources, whether or not used to create white light, can take many forms in a backlight, with different effects on color and brightness uniformity of the backlight output area. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow or red/green/blue. In still another approach, such individually packaged multicolored LEDs can be positioned in one or more lines, arrays, or other patterns.

Depending on the choice of light source, the back reflector, transflector, and other components of the backlight will be exposed to different amounts of UV radiation, with CCFL and HCFL sources emitting more UV radiation in general than LED sources. Hence, components of the backlight may incorporate UV absorbers or stabilizers, or may utilize materials selected to minimize UV degradation. If low UV-output sources such as LEDs are used to illuminate the backlight, UV absorbers and the like may not be necessary, and a wider selection of materials is available. In addition to UV absorbers and stabilizers, the transflector may also comprise dyes and/or pigments to adjust transmission, color, and other optical characteristics of the transflector, recycling cavity, and backlight.

Reducing color shift is a key problem with LED backlights and generally will require the use of color sensors and temperature sensors, since LED output can be affected by both of these factors. Color shift occurs when, for example, the three RGB LEDs exhibit different emission characteristics due to temperature or temporal change. It may be necessary to use a sensor to detect LED fluctuation and automatically adjust LEDs or individual LCD pixel intensity to compensate. Sensor locations could be internal to a recycling cavity if it is desirable to control cavities individually. If individual cavity control is not necessary, one or more sensors could be located outside the tunnel. Suitable sensors include silicon photodiode color sensors available from Texas Advanced Optical Solutions Inc (TAOS), Plano Tex.

Examples

Testing Equipment and Setup

The following examples were tested in a custom LED backlight test bed. The test bed was designed to simulate an LED-based area backlight for a 559 mm (22") diagonal, 16:9 aspect-ratio, LCD television. The test bed had an open rectangular box frame forming side walls of the backlight cavity, the long axis of the frame being placed horizontally. The inside walls of the box frame were lined with the EDR II film described above, which is a high reflectivity diffuse white film.

The front side of the box frame was covered with a removable diffuser plate made from a diffuse white polymethyl methacrylate plate (Cyro Corp., Rockaway, N.J.) about 3 mm thick. This diffuser plate is similar to diffuser plates currently used in CCFL and LED-based television backlights. The outer surface of the plate serves as the output surface for the test bed (i.e., the output area of the backlight).

A backplane was attached to the back side of the box frame on four linear slides that allowed the backplane to be adjusted to different depths within the backlight cavity.

Four LED bars were affixed to the backplane on the side of the backplane facing the diffuser plate. The bars were arranged in two horizontal rows spanning the width of the backplane. Each bar had 5 red, 5 blue, and 10 green side-emitting Luxeon™ LEDs (Lumileds, San Jose, Calif.) arranged in a repeating green-red-blue-green pattern in a single line on a standard printed-circuit board. The center-to-center spacing between LEDs on a single bar was about 12 mm. The center-to-center spacing between adjacent horizontal rows was 152 mm.

On a single bar, the green, red, and blue LEDs were electrically connected in series by color so that the output of each color could be varied independently to allow for adjusting the color balance of the test bed. Two, two-channel power supplies were connected to each bar. One power supply channel provided the drive current to the red LEDs, one channel provided current to the blue LEDs, and two channels provided current to the green LEDs each channel driving 5 of the green LEDs. During a typical measurement, the red LEDs were driven at about 150 mA, the blue LEDs were driven at about 170 mA, and the green LEDs were driven at about 130 mA. Before the first measurements were taken, the LEDs were 'burned-in' by running them all at 350 mA for 166 hours, after which the output from the test bed was observed to be relatively stable over time.

A polycarbonate reflector support plate was attached to the backplane over the LED circuit boards. The reflector support plate was rectangular and slightly smaller than the inside of the test bed frame. The reflector support plate had holes to allow the LED lenses to extend through the plate. When mounted, the top surface of the reflector support plate was aligned with the bottom of the LED lenses. A high-reflectivity, specular back reflector film (Vikuiti™ ESR film from 3M) was laminated to the reflector support plate. Thus mounted, the film layer was substantially flat and acted as the bottom surface of the optical cavity of the backlight (i.e., it acted as the back reflector). Directly beneath the back reflector film, the support plate was provided with linear grooves or channels extending parallel to the rows of LEDs, and disposed on both sides of the LED rows. By slitting the back reflector film immediately above two selected channels (between which was at least one row of LEDs), a transflector film whose width was greater than the distance between the selected channels could be compressed, forming a concave arc or bow, and opposed edges of the transflector film inserted into the selected channels through the slits in the back reflector film. A recycling cavity could thus be formed between the back reflector film and the concave-shaped transflector.

The performance of the test bed was measured using a colorimetric camera (model PM 1611 from Radiant Imaging, Inc., Duvall, Wash.). The camera was fitted with a 105 mm lens and a ND2 neutral density filter. The software supplied by Radiant Imaging was used to calibrate the camera and take the measurements. Color and luminance calibration was done with the aid of a spot radiometer (model PR650 from Photo Research, Inc., Chatsworth, Calif.). The test bed was placed in the vertical orientation, 4 meters in front of the camera. The test bed was aligned to the camera such that the axis of the camera lens was normal to the diffuser plate and aimed approximately at the center of the test bed.

Backlight constructions were measured by mounting the appropriate films (back reflector and test film) in the test bed and setting the backplane at the appropriate position to achieve the desired backlight cavity thickness (defined as the space between the top of the back reflector plate and the bottom of the diffuser plate). Backlight cavity thicknesses that were used include 18, 28, 38, and 48 mm. For recycling cavities, the films were cut to a specific width and then affixed to the backplane by wedging the edges of the film into the channels cut in the backplane, the stiffness of the film causing it to form into an arc and remain in position. The recycling cavity height or depth is determined by the width of the film and the spacing between the channels that the film was wedged into.

The LEDs were turned on and warmed up for at least 90 minutes prior to recording any measurements. Measurements were carried out by configuring the test bed with the films to be tested, and then using the colorimetric camera to take pictures of the test bed with the backplane set at various depths. The results were inspected visually and analyzed for properties such as total luminance, luminance uniformity, and color uniformity across the surface of the diffuser plate.

Control

The backlight cavity was configured having no recycling cavity films between the ESR back reflector and the diffuser plate. The backlight cavity depth was 28 mm from the top of the back reflector to the bottom of the diffuser plate.

The appearance of the output area, i.e. the top of the diffuser plate, was highly non-uniform. An image or blur corresponding to each LED and their respective colors was clearly visible at the output area.

Example 1

Two Linear Cavities, W/d=6.7

In this example, the recycling cavities were formed from two layers of DRPF polarizing film as described above laminated together, the pass axes of the two layers being perpendicular to one another. The backlight cavity was configured with two individual recycling cavities defined by the ESR back reflector and the layered DRPF films, the cavities taking the shape of an arc where the top of the arcs were approximately 18 mm above the back reflector. The width of each recycling cavity was approximately 121 mm and they were situated in the backlight cavity such that each recycling cavity was approximately 13 mm from the top and bottom sides respectively and were separated in the middle by approximately 13 mm. The LEDs were oriented horizontally across the backlight and were parallel to and located within the recycling cavities. The backlight cavity depth was 28 mm from the top of the back reflector to the bottom of the diffuser plate.

In appearance, this example demonstrated an improvement over the control with respect to brightness and color uniformity.

Example 2

Two Linear Cavities, W/d=10.1

In this example, the recycling cavities were formed using a cube corner light deflecting film as the transflector. This film was a single layer of 10 mil thick polycarbonate sheeting, the sheeting being flat and smooth on one major surface and having a pattern of prismatic pits or voids formed in the opposed major surface. The pattern of prismatic pits was the inverse or complement of the pyramidal cube corner array used in 3M™ Scotchlite™ Reflective Material 6260 High Gloss Film available from 3M Company, which pyramidal array is characterized by canted cube corner prisms whose height (from triangular base to cube corner peak) is about 3.5 mils, and whose base triangles have included angles of 55, 55, and 70 degrees. This transflective film was oriented such that the structured or pitted side of the film faced the LEDs. The backlight cavity was configured with two individual recycling cavities defined by the ESR back reflector and transflector, the cavities taking the shape of an arc where the top of the arcs were approximately 12 mm above the back reflector. The width of each recycling cavity was approximately 121 mm and they were situated in the backlight cavity such that each recycling cavity was approximately 13 mm from the top and bottom respectively and were separated in the middle by approximately 13 mm. The LEDs were oriented horizontally across the backlight and were are parallel to and located within the recycling cavities. The backlight cavity depth was 28 mm from the top of the back reflector to the bottom of the diffuser plate.

In appearance, this example demonstrated an improvement over the control with respect to brightness and color uniformity.

Example 3

One Linear Cavity, W/d=11.5

In this example, the recycling cavity was formed from a two layer laminate of Vikuiti™ BEF II 90/50 linear prismatic optical films, available from 3M Company. A first piece of this BEF II film was attached to a second piece of BEF II film using adhesive, the linear prisms of the first BEF II film being oriented perpendicular to the linear prisms of the second BEF II film. As described in U.S. Pat. No. 6,846,089 (Stevenson et al.), a thin layer of adhesive was applied to the planar side of the first film, and the structured side of the second film was placed against the adhesive to form the laminate. The thickness of the adhesive layer was such that only the prism tips of the second film were immersed in the adhesive layer. The prisms of both pieces of BEF II faced toward the LEDs, and the prism direction of the BEF II film nearest the LEDs was parallel to the LED bars. The backlight cavity was configured with a single recycling cavity defined by the ESR back reflector and the BEF II laminate, the recycling cavity taking the shape of a single arc. The apex of the arc was approximately 22 mm above the back reflector. The width of the recycling cavity was approximately 254 mm and it was situated in the backlight cavity such that it was approximately 13 mm from the top and bottom respectively. The LEDs were oriented horizontally across the backlight and were parallel to and located within the recycling cavity. The backlight cavity depth was 28 mm from the top of the back reflector to the bottom of the diffuser plate.

In appearance, this example demonstrated an improvement over the control with respect to brightness and color uniformity.

Example 4

Two Linear Cavities, W/d=6.7

In this example, the recycling cavities were formed from a two layer laminate of BEF II optical films as described above. A first piece of BEF II film was attached to a second piece of BEF II film using adhesive, the linear prisms of the first BEF II film being oriented perpendicular to the linear prisms of the second BEF II film. As described in U.S. Pat. No. 6,846,089 (Stevenson et al.), a thin layer of adhesive was applied to the planar side of the first film and the structured side of the second film was placed against the adhesive to form the laminate. The thickness of the adhesive layer was such that only the prism tips of the second film were immersed in the adhesive layer. The prisms of both pieces of BEF II faced toward the LEDs, and the prism direction of the BEF II film nearest the LEDs was parallel to the LED bar. The backlight cavity was configured with two individual recycling cavities defined by the ESR back reflector and the BEF II laminate taking the shape of arcs where the top of the arcs were approximately 18 mm above the back reflector. The width of each recycling cavity was approximately 121 mm and they were situated in the backlight cavity such that each recycling cavity was approximately 13 mm from the top and bottom respectively and were separated in the middle by approximately 13 mm. The LEDs were oriented horizontally and were parallel to and located within the recycling cavities. The backlight cavity depth was 28 mm from the top of the back reflector to the bottom of the diffuser plate.

In appearance, this example demonstrated an improvement over the control with respect to brightness and color uniformity.

Example 5

Two Linear Cavities, W/d=9.5

In this example, the recycling cavities were formed from perforated Vikuiti™ ESR film as described above, which was laminated to a polycarbonate substrate having a slight amount of haze. The perforated ESR film had holes whose diameters ranged from about 0.25 mm to 0.75 mm in a substantially random distribution over the surface of the film, but the centers of these holes were regularly arranged in a hexagonal lattice with hole-to-hole (measured from centers) spacing of approximately 1.5 mm. The backlight cavity was configured with two individual recycling cavities defined by the ESR back reflector and perforated ESR films, the recycling cavities taking the shape of an arc where the top of the arc was approximately 14 mm above the reflective back reflector. Each recycling cavity was approximately 133 mm wide and was situated in the backlight cavity such that each recycling cavity was approximately in contact with the top and bottom sidewalls and were separated in the middle by approximately 13 mm. The LEDs were oriented horizontally across the backlight and were parallel to and located within the recycling cavities. The backlight cavity depth was 28 mm from the top of the back reflector to the bottom of the diffuser plate.

In appearance, this example demonstrated an improvement over the control with respect to brightness and color uniformity.

Measurement Results

A comparison of Examples 1-5 is shown in Table 1. A Relative Efficiency parameter was calculated for each backlight construction by dividing the average brightness of the example by the average brightness of the control, where average brightness in each case was calculated for substantially the entire output area of the respective backlights. A Brightness Non-Uniformity parameter was calculated for each backlight construction by dividing the standard deviation of brightness by the average brightness over substantially the entire output area of the backlight. A Color Non-Uniformity parameter ($\Delta uv$) was calculated for each backlight construction as the average value of the point-wise deviation of the color from the average color of the example, where color is expressed in CIE u'v' color space. Thus, $$\Delta uv = \frac{1}{N} \sum_N \sqrt{(u' - u'_{avg})^2 + (v' - v'_{avg})^2},$$

where N is the number of pixels in the image of the test system, u' and v' are the color coordinates for each pixel, and $u'_{avg}$ and $v'_{avg}$ are the average color coordinates. This color non-uniformity was measured not over the entire output area, but over a rectangular portion of the output area 10.5 inches long and 3 inches wide, centered over the upper LED bar or row of the backlight prototype. of the entire test system.

TABLE 1

Relative Efficiency, Brightness Non-Uniformity, Color Non-Uniformity

| Example | Relative Efficiency | Brightness Non-Uniformity | Color Non-uniformity |
|---|---|---|---|
| Control | 100% | 12.5% | 0.0090 |
| Example 1 | 88% | 11.7% | 0.0045 |
| Example 2 | 104% | 7.1% | 0.0065 |
| Example 3 | 91% | 9.3% | 0.0048 |
| Example 4 | 93% | 10.1% | 0.0050 |
| Example 5 | 82% | 7.0% | 0.0043 |

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

Various modifications and alterations of this invention will be apparent to those skilled in the art without departing from the scope and spirit of this invention, and it should be understood that this invention is not limited to the illustrative embodiments set forth herein. All U.S. patents and other patent and non-patent documents referred to herein are incorporated by reference, to the extent they are not inconsistent with the foregoing disclosure.

What is claimed is:

1. A direct-lit backlight having an output area, comprising:
   a back reflector;
   a curved transflector that partially transmits and partially reflects incident light, the curved transflector being shaped to form at least one concave structure facing the back reflector to provide one or more recycling cavities therebetween, the one or more recycling cavities substantially filling the output area of the backlight; and
   at least one light source disposed behind the output area to inject light into the one or more recycling cavities;
   wherein the curved transflector consists essentially of a structure selected from the group of a semi-reflective film and a light deflecting film.

2. A direct-lit backlight having an output area, comprising:
   a back reflector;
   curved transflector means for partially transmitting and partially reflecting incident light, the curved transflector means including at least one concave structure facing the back reflector to provide one or more recycling cavities therebetween, the one or more recycling cavities substantially filling the output area of the backlight; and
   light source means disposed behind the output area for injecting light into the one or more recycling cavities;
   wherein the curved transflector means consists essentially of a structure selected from the group of a semi-reflective film and a light deflecting film.

3. The backlight of claim 1, wherein the at least one light source is disposed in the one or more recycling cavities or disposed behind the back reflector.

4. The backlight of claim 1, wherein each recycling cavity is hollow.

5. The backlight of claim 1, wherein the at least one concave structure consists essentially of a single concave structure, and the one or more recycling cavities consists essentially of a single recycling cavity.

6. The backlight of claim 1, wherein the at least one concave structure includes a plurality of concave structures, and the one or more recycling cavities includes a plurality of recycling cavities.

7. The backlight of claim 6, wherein the concave structures each have a concave cross-sectional profile in a first plane and a substantially flat cross-sectional profile in a second plane perpendicular to the first plane.

8. The backlight of claim 6, wherein each of the recycling cavities extends across a dimension of the output area.

9. The backlight of claim 1, wherein the at least one light source comprises a plurality of LEDs.

10. The backlight of claim 9, wherein the plurality of LEDs comprises LEDs that emit in different colors.

11. The backlight of claim 9, wherein the curved transflector is shaped to form a plurality of concave structures facing the back reflector to provide a plurality of recycling cavities, and wherein for each recycling cavity there is at least one LED disposed behind the output area to inject light into such recycling cavity.

12. The backlight of claim 1, wherein the curved transflector comprises a scored film.

13. The backlight of claim 1, wherein the curved transflector comprises a film held in compression.

14. A display system comprising a display panel and the backlight of claim 1.

15. The system of claim 14, wherein the display panel comprises a liquid crystal display (LCD).

16. The system of claim 15, wherein the system comprises an LCD television.

17. A direct-lit backlight having an output area, comprising:
   a back reflector;
   a transflector that partially transmits and partially reflects incident light, the transflector being shaped to form a plurality of concave structures facing the back reflector to provide a plurality of recycling cavities therebetween, the plurality of recycling cavities substantially filling the output area of the backlight, wherein the concave structures each have concave cross-sectional profiles in both a first and second mutually perpendicular plane; and
   at least one light source disposed behind the output area to inject light into the plurality of recycling cavities;
   wherein the curved transflector consists essentially of a structure selected from the group of a semi-reflective film and a light deflecting film.

* * * * *